(12) United States Patent
Capati et al.

(10) Patent No.: US 10,658,646 B2
(45) Date of Patent: May 19, 2020

(54) INTEGRATED CURRENT COLLECTOR FOR ELECTRIC VEHICLE BATTERY CELL

(71) Applicant: SF Motors, Inc., Santa Clara, CA (US)

(72) Inventors: Nathalie Capati, Santa Clara, CA (US); Duanyang Wang, Santa Clara, CA (US); Jacob Heth, Santa Clara, CA (US); Binbin Chi, Santa Clara, CA (US)

(73) Assignees: CHONGQING JINKANG NEW ENERGY VEHICLE CO., LTD., Chongqing (CN); SF MOTORS, INC., Santa Clara, CA (US)

( * ) Notice: Subject to any disclaimer, the term of this patent is extended or adjusted under 35 U.S.C. 154(b) by 79 days.

(21) Appl. No.: 16/118,360

(22) Filed: Aug. 30, 2018

(65) Prior Publication Data
US 2019/0081309 A1   Mar. 14, 2019

Related U.S. Application Data

(60) Provisional application No. 62/557,681, filed on Sep. 12, 2017.

(51) Int. Cl.
*H01M 2/20* (2006.01)
*H01M 10/48* (2006.01)
(Continued)

(52) U.S. Cl.
CPC .............. *H01M 2/206* (2013.01); *B60L 50/64* (2019.02); *H01M 2/1077* (2013.01); *H01M 10/482* (2013.01); *H01M 2220/20* (2013.01)

(58) Field of Classification Search
CPC ........ H01M 4/70; H01M 2/206; H01M 2/105; H01M 2/1077; H01M 2/26; H01M 2220/20
See application file for complete search history.

(56) References Cited

U.S. PATENT DOCUMENTS

| | | | |
|---|---|---|---|
| 2007/0009787 A1* | 1/2007 | Straubel ................ | H01M 2/105 429/99 |
| 2011/0206978 A1* | 8/2011 | Muis ..................... | H01M 2/206 429/158 |

(Continued)

FOREIGN PATENT DOCUMENTS

JP          2013038055 A  *  2/2013   .......... H01M 2/0242

*Primary Examiner* — Matthew J Merkling
(74) *Attorney, Agent, or Firm* — Foley & Lardner LLP; James De Vellis

(57) ABSTRACT

Systems and methods to power an electric vehicle are provided. The system can include a battery pack having a plurality of battery modules, each of the of battery modules can include a plurality of battery blocks. The battery blocks can include a plurality of cylindrical battery cells. An integrated current collector device can be formed in a single structure and coupled with the plurality of cylindrical battery cells. The integrated current collector device can include a first current collector to couple with positive terminals of the cylindrical battery cells at first ends of the cylindrical battery cells and a second current collector to couple with negative terminals of the cylindrical battery cells at the first ends of the cylindrical battery cells. An isolation layer can be disposed between the first current collector and the second current collector to electrically isolate the first current collector from the second current collector.

20 Claims, 6 Drawing Sheets

(51) Int. Cl.
*H01M 2/10* (2006.01)
*B60L 50/64* (2019.01)

(56) References Cited

U.S. PATENT DOCUMENTS

| | | | |
|---|---|---|---|
| 2012/0231309 A1* | 9/2012 | Itoi | H01M 2/1077 |
| | | | 429/99 |
| 2016/0181579 A1* | 6/2016 | Geshi | H01M 2/206 |
| | | | 429/61 |
| 2019/0081364 A1* | 3/2019 | Capati | H01M 10/425 |
| 2019/0097190 A1* | 3/2019 | Seol | H01M 2/204 |
| 2019/0109356 A1* | 4/2019 | Kaga | H01M 2/10 |
| 2019/0207184 A1* | 7/2019 | Koutari | H01M 2/26 |
| 2019/0221814 A1* | 7/2019 | Shimizu | H01M 2/10 |
| 2019/0305262 A1* | 10/2019 | Nakasawa | H01M 2/20 |
| 2019/0312251 A1* | 10/2019 | Matthews | H01M 2/204 |

\* cited by examiner

INTEGRATED CURRENT COLLECTOR FOR ELECTRIC VEHICLE BATTERY CELL

CROSS REFERENCE TO RELATED APPLICATION

The present application claims the benefit of priority under 35 U.S.C. § 119(e) to U.S. Provisional Application 62/557,681, titled "INTEGRATED CURRENT COLLECTOR", filed on Sep. 12, 2017. The entire disclosure of which is incorporated herein by reference in its entirety.

BACKGROUND

Vehicles such as automobiles can include power sources. The power sources can power motors or other systems of the vehicles.

SUMMARY

In at least one aspect, a system to power electric vehicles. The system can include a battery pack to power an electric vehicle. The battery pack can include a plurality of battery modules. Each of the plurality of battery modules can include a plurality of battery blocks. A first battery block of the plurality of battery blocks can include a pair of battery block terminals. The first battery block can include a plurality of cylindrical battery cells. Each of the plurality of cylindrical battery cells can include a positive terminal and a negative terminal. An integrated current collector device can be formed in a single structure. The integrated current collector device can include a first current collector having a conductive layer. The conductive layer of the first current collector can couple the first current collector with positive terminals of the plurality of cylindrical battery cells at first ends of the plurality of cylindrical battery cells. A second current collector can include a conductive layer. The conductive layer of the second current collector can couple the second current collector with negative terminals of the plurality of cylindrical battery cells at the first ends of the plurality of cylindrical battery cells. An isolation layer can be disposed between the first current collector and the second current collector. The isolation layer can electrically isolate the first current collector from the second current collector. The isolation layer can bind the first current collector with the second current collector to form the single structure of the integrated current collector. The integrated current collector can provide structural support to hold the plurality of cylindrical battery cells in place relative to one another when the plurality of cylindrical battery cells are electrically connected with the first current collector and the second current collector.

In another aspect, a method of providing a system to power electric vehicles is provided. The method can include providing a battery pack to power an electric vehicle. The battery pack can include a plurality of battery modules. Each of the plurality of battery modules can include a plurality of battery blocks. A first battery block of the plurality of battery blocks can include a pair of battery block terminals. The method can include disposing a plurality of cylindrical battery cells in the first battery block. Each of the cylindrical battery cells can include a positive terminal and a negative terminal. The method can include forming an integrated current collector device via injection molding. The integrated current collector device can include a first current collector, a second current collector, and an isolation layer disposed between the first current collector, a second current collector. The method can include electrically isolating, using the isolation layer, the first current collector from the second current collector in the integrated current collector device. The method can include mounting the integrated current collector device, including the first current collector, the second current collector, and the isolation layer, to the plurality of cylindrical battery cells. The integrated current collector device can provide structural support to hold the plurality of cylindrical battery cells in place relative to one another. The method can include electrically connecting the first current collector to positive terminals of the plurality of cylindrical battery cells at first ends of the plurality of cylindrical battery cells. The method can include electrically connecting the second current collector to negative terminals of the plurality of cylindrical battery cells at the first ends of the plurality of cylindrical battery cells.

In another aspect, a method of providing a system to power electric vehicles is provided. The system can include a battery pack to power an electric vehicle. The battery pack can include a plurality of battery modules. Each of the plurality of battery modules can include a plurality of battery blocks. A first battery block of the plurality of battery blocks can include a pair of battery block terminals. The first battery block can include a plurality of cylindrical battery cells. Each of the plurality of cylindrical battery cells can include a positive terminal and a negative terminal. An integrated current collector device can be formed in a single structure. The integrated current collector device can include a first current collector having a conductive layer. The conductive layer of the first current collector can couple the first current collector with positive terminals of the plurality of cylindrical battery cells at first ends of the plurality of cylindrical battery cells. A second current collector can include a conductive layer. The conductive layer of the second current collector can couple the second current collector with negative terminals of the plurality of cylindrical battery cells at the first ends of the plurality of cylindrical battery cells. An isolation layer can be disposed between the first current collector and the second current collector. The isolation layer can electrically isolate the first current collector from the second current collector. The isolation layer can bind the first current collector with the second current collector to form the single structure of the integrated current collector. The integrated current collector can provide structural support to hold the plurality of cylindrical battery cells in place relative to one another when the plurality of cylindrical battery cells are electrically connected with the first current collector and the second current collector.

In another aspect, an electric vehicle is provided. The electric vehicle can include a battery pack to power an electric vehicle. The battery pack can include a plurality of battery modules. Each of the plurality of battery modules can include a plurality of battery blocks. A first battery block of the plurality of battery blocks can include a pair of battery block terminals. The first battery block can include a plurality of cylindrical battery cells. Each of the plurality of cylindrical battery cells can include a positive terminal and a negative terminal. An integrated current collector device can be formed in a single structure. The integrated current collector can include a first current collector having a conductive layer. The conductive layer of the first current collector can couple the first current collector with positive terminals of the plurality of cylindrical battery cells at first ends of the plurality of cylindrical battery cells. A second current collector can include a conductive layer. The conductive layer of the second current collector can couple the second current collector with negative terminals of the plurality of cylindrical battery cells at the first ends of the plurality of cylindrical battery cells. An isolation layer can be disposed between the first current collector and the second current collector. The isolation layer can electrically isolate the first current collector from the second current collector. The isolation layer can bind the first current collector with the second current collector to form the single structure of the integrated current collector. The integrated current collector can provide structural support to hold the plurality of cylindrical battery cells in place relative to one another when the plurality of cylindrical battery cells are electrically connected with the first current collector and the second current collector.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not necessarily intended to be drawn to scale. Like reference numbers and designations in the various drawings indicate like elements. For purposes of clarity, not every component may be labelled in every drawing. In the drawings.

DETAILED DESCRIPTION

Following below are more detailed descriptions of various concepts related to, and implementations of, methods, apparatuses, devices, and systems to battery packs to power electric vehicles. The various concepts introduced above and discussed in greater detail below may be implemented in any of numerous ways.

The systems and methods for providing power to electric vehicles disclosed herein describe a battery pack that can reside in or be disposed within an electric vehicle to provide power to the electric vehicle. The battery pack can include a plurality of battery modules. The plurality of battery modules can include a plurality of battery blocks. The battery blocks can include a plurality of cylindrical battery cells. Each of the plurality of cylindrical battery cells can include a positive terminal and a negative terminal that couple with an integrated current collector device. The integrated current collector device can include positive and negative current collectors embedded in the integrated current collector device to provide single-step direct welding. For example, the integrated current collector device as described herein can provide positive and negative current collectors coupled at the same end or surface of each of the batter cells. Thus, the positive and negative connections can be made from the same end or surface of each of the battery cells to the positive and negative current collectors, respectively, of the integrated current collector device.

By mounting or coupling the integrated current collector device having both positive and negative current collectors to the same end or surface of each of the battery cells, the assembly process can be simplified and defects introduced during assembly, for instance, can be reduced. For example, battery pack assembly can involve numerous parts which can make assembly and manufacturing difficult. Consider that the defect rate for automotive battery packs can be 25 parts per million (PPM), where 1 PPM=1 defect/1,000,000 for instance. It can be challenging to improve battery pack manufacturing, given that current collectors are electrically connected to battery cells by welding or wire-bonding. Handling of active electrical components, such as during hand assembly in high voltage applications, can involve or entail much caution. The battery packs described herein include cylindrical battery cells coupled with an integrated current collector device having a positive current collector and a negative current collector. The integrated current collector devices can decrease part count, lower PPM and increases part quality. The embedded sense lines can provide for battery monitoring during welding, identify issues and defects at an early stage of assembly.

Figure 1:
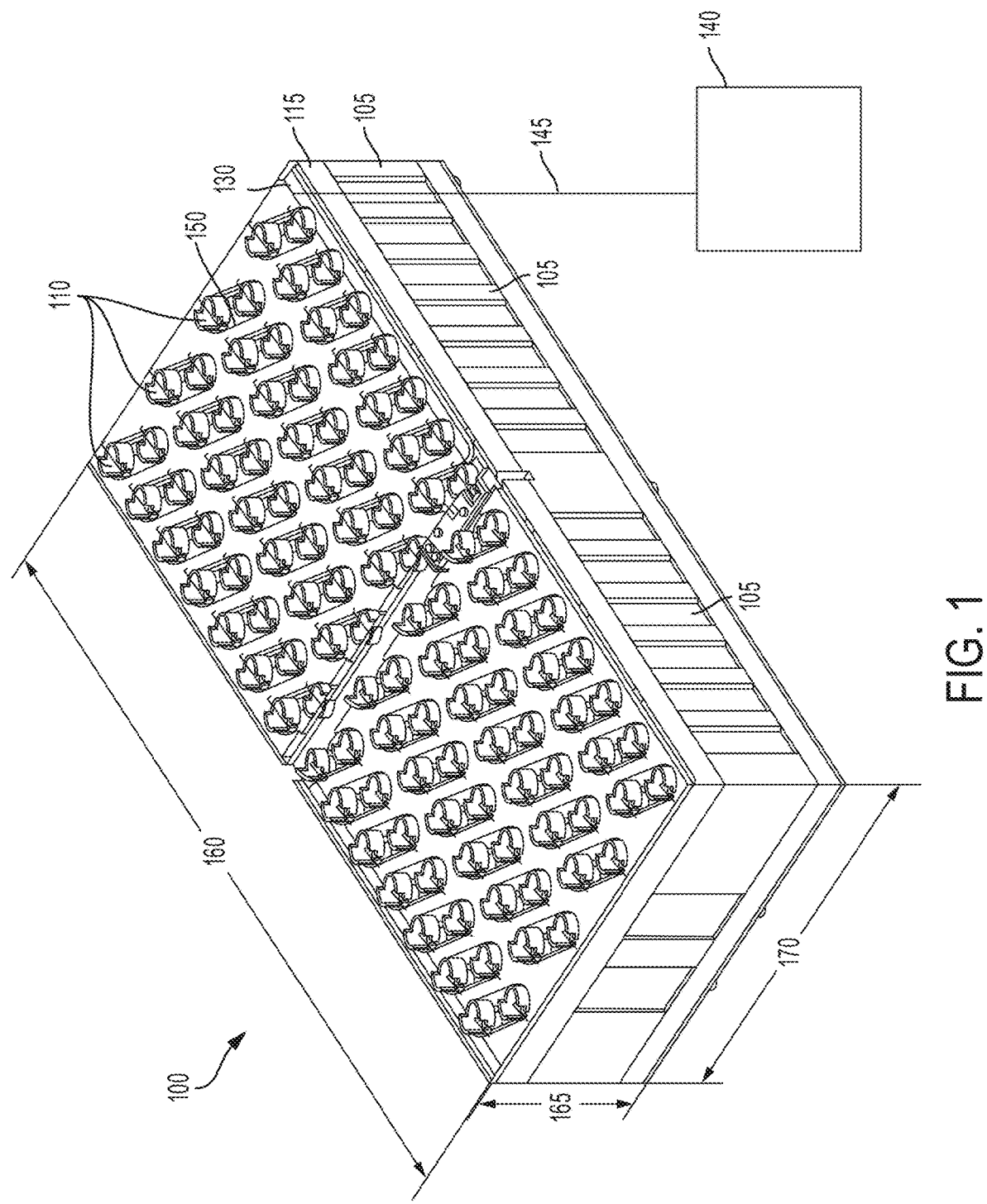
FIG. 1 depicts an illustrative embodiment of a system to power an electric vehicle.

FIG. 1, among others, depicts a battery module 100 having two battery blocks 105 (e.g., a first battery block 105 and a second battery block 105). The first and second battery blocks 105 can be subcomponents of the battery module 100. The battery module 100 can refer to a battery system having multiple battery blocks 105 (e.g., two or more). For example, multiple battery blocks 105 can be electrically coupled with each other to form a battery module 100. The battery modules 100 can be formed having a variety of different shapes. For example, the shape of the battery modules 100 can be determined or selected to accommodate a battery pack within which a respective battery module 100 is to be disposed. The shape of the battery modules 100 may include, but not limited to, a square shape, rectangular shape, circular shape, or a triangular shape. Battery modules 100 in a common battery pack can have the same shape. One or more battery modules 100 in a common battery pack can have a different shape from one or more other battery modules 100 in the common battery pack.

The number of battery blocks 105 in a battery module 100 can vary and can be selected based at least in part on an amount of energy or power to be provided to an electric vehicle. For example, the battery module 100 can couple with one or more bus-bars within a battery pack or couple with a battery pack of an electric vehicle to provide electrical power to other electrical components of the electric vehicle.

The battery module 100 can include multiple battery blocks 105. The battery module 100 can include multiple cell holders (e.g., first cell holder 225 and second cell holder 230 of FIG. 2) to hold or couple the battery blocks 105 together, and to couple the battery cells 110 to form the battery blocks 105 together. Battery blocks 105 can be held together using one or more cell holders 225, 230. For example, a single one of cell holders 230, 235 can house at least two battery blocks 105 in a single plastic housing. The battery cells 110 can be positioned within the respective one of the cell holder 230, 235 using adhesive material (e.g., 2-part epoxy, silicone-based glue, or other liquid adhesive), heat staking, or press fit. The battery cells 110 can be positioned within the respective one of the cell holder 230, 235 to hold them in place. For example, the battery cells 110 can have a tolerance in height as part of the manufacturing process. This tolerance can be accounted for by locating either the top or bottom of the respective battery cells 110 to a common plane and fixing them there within the respective one of the cell holder 230, 235. For example, a bottom end of each of the battery cells 110 can be positioned flat relative to each other to provide a flat mating surface to a cold plate. The top end of the battery cells 110 can be positioned flat relative to the first cell holder 230 to provide or form a flat plane for forming battery cell to current collector connections (e.g., wirebonding, laser welding). The flat plane may only be provided on a top or bottom plane of the battery cells 110 because the cell holders 230, 235 can be retained in the respective battery module 100 using adhesive material (e.g., 2-part epoxy, silicone-based glue, or other liquid adhesive), bolts/fasteners, pressure sensitive adhesive (PSA) tape, or a combination of these materials. The structure of the battery module 100 that the cell holders 230, 235 are placed in or disposed in can include a stamped, bent, or formed metal housing or could be a plastic housing made by injection molding or another manufacturing method.

The first and second battery blocks 105 include a plurality of battery cells 110. The battery cells 110 can be homogeneous or heterogeneous in one or more aspects, such as height, shape, voltage, energy capacity, location of terminal (s) and so on. The first battery block 105 may include the same number of battery cells 110 as the second battery block, or the first battery block 105 may have a different number of battery cells 110 (e.g., greater than, less than) the second battery block 105. The first and second battery blocks 105 can include any number of battery cells 110 arranged in any configuration (e.g., an array of N×N or N×M battery cells, where N, M are integers). For example, a battery block 105 may include two battery cell 110 or fifty battery cells 110. The number of battery cells 110 included within a battery block 105 can vary within or outside this range. The number of battery cells 110 included within a battery block 105 can vary based in part on battery cell level specifications, battery module level requirements, battery pack level requirements or a combination of these that you are trying to obtain or reach with the respective battery block 105.

The number of battery cells 110 to include in a particular battery block 105 can be determined based at least in part on a desired capacity of the battery block 105 or a particular application of the battery block 105. For example, a battery block 105 can contain a fixed "p" amount of battery cells, connected electrically in parallel which can provide a battery block capacity of "p" times that of the single battery cell capacity. The voltage of the respective battery block 105 (or cell block) can be the same as that of the single battery cell 110 (e.g., 0V to 5V or other ranges), which could be treated as larger cells that can be connected in series into the battery module 100 for battery packs for example. For example, the plurality of cylindrical battery cells 110 can provide a battery block capacity to store energy that is at least five times greater than a battery cell capacity of each of the plurality of cylindrical battery cells 110. The battery blocks 105 can have a voltage of up to 5 volts across the pair of battery block terminals of the respective battery block 105.

The battery blocks 105 can each include one or more battery cells 110 and each of the plurality of battery cells 110 can have a voltage of up to 5 volts (or other limit) across terminals of the corresponding battery cell. For example, the battery blocks 105 can include an arrangement of a plurality of battery cells 110 electrically connected in parallel. Each cell of the plurality of battery cells can be spatially separated from each of at least one adjacent cell by, for example, two millimeter (mm) or less. The arrangement of the plurality of battery cells can form a battery block 105 for storing energy and can have a voltage of up to 5 volts across terminals of the respective battery block 105.

For instance, a single battery cell 110 can have a maximum voltage of 4.2V, and the corresponding battery block 105 can have a maximum voltage of 4.2V. For example, a battery block 105 using 5 volts/5 Ampere-hour (5V/5 Ah) cells with 60 cells in parallel can become a 0V to 5V, 300 Ah modular unit. The battery block 105 can have high packaging efficiency by utilizing the most efficient minimum cell to cell spacing (e.g., any value from 0.3 mm to 2 mm) that prevents thermal propagation within the block with each cell having an individual and isolated vent port for instance. For example, spatial separation between adjacent cells of less than 1 mm can be implemented in the present battery blocks 105. The battery block 105 can thus be small, e.g., less than 0.05 cubic feet, giving it a high volumetric energy density for high packing efficiency.

Figure 2:
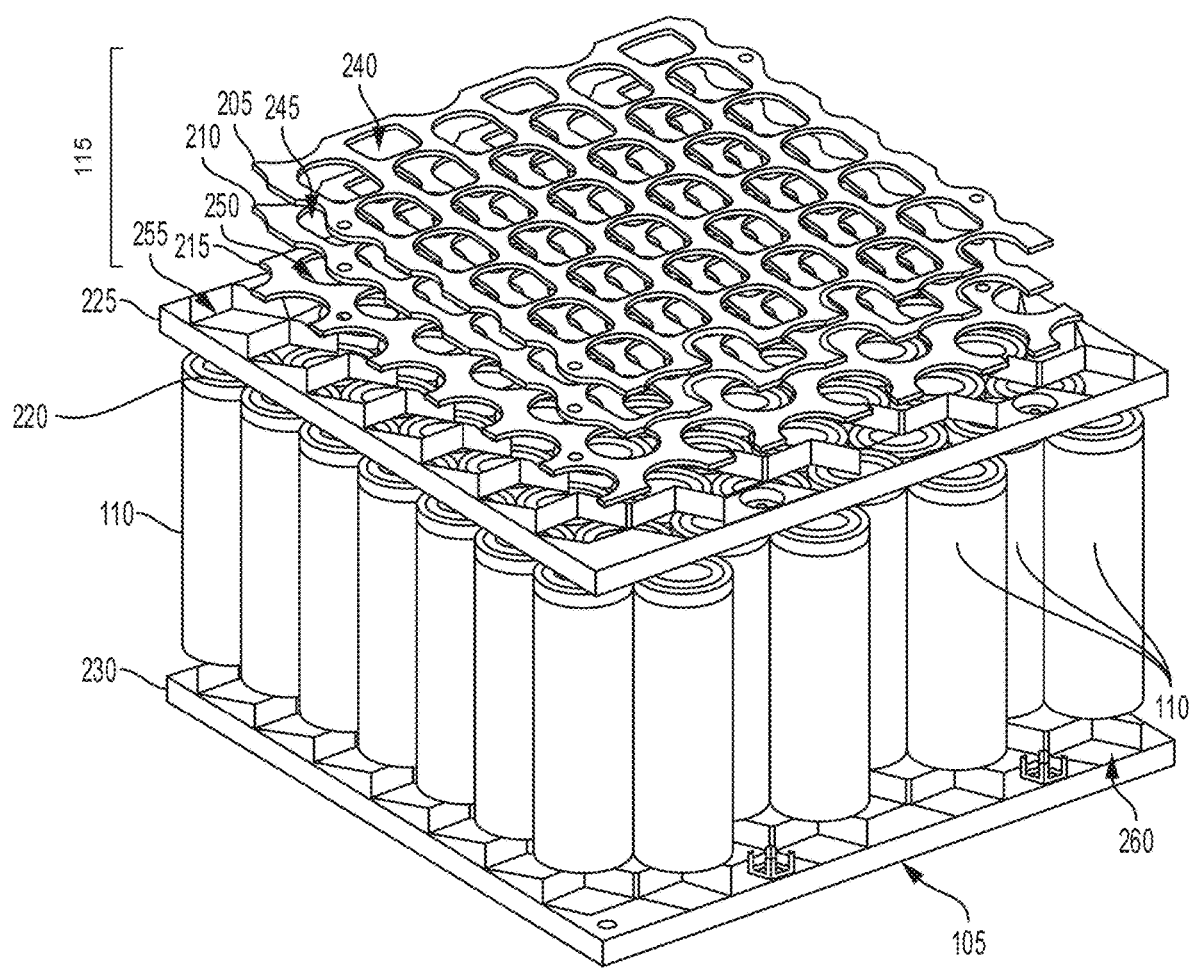
FIG. 2 depicts an exploded view of an illustrative embodiment of a system to power an electric vehicle.
Figure 3:
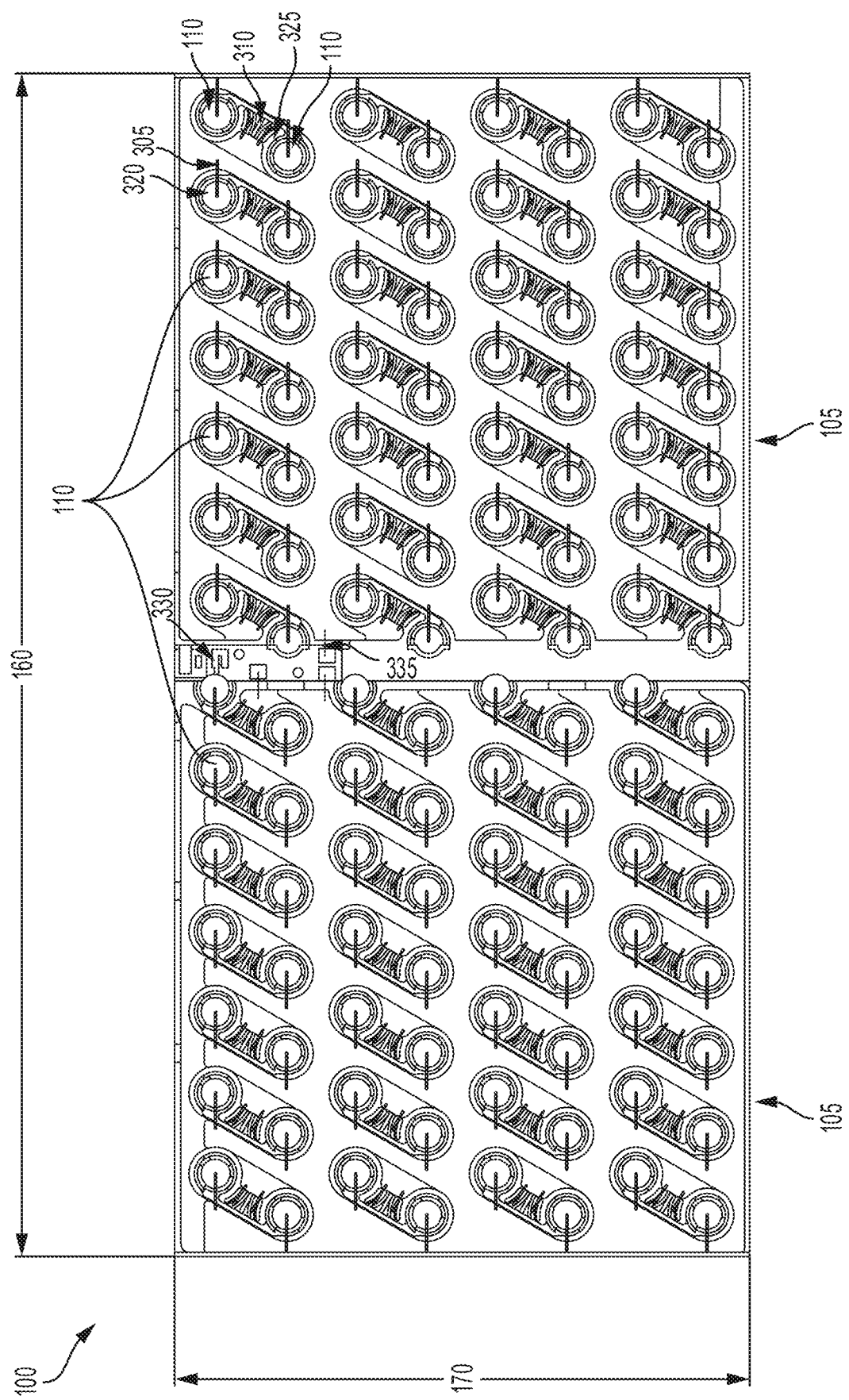
FIG. 3 depicts a top view of an illustrative embodiment of a system to power an electric vehicle.

The battery block 105 can include battery cells 110 physically arranged in parallel to each other along the longest dimension of each battery cell 110. The battery cells 110 can be arranged physically as a two dimensional array of battery cells 110 (e.g., as shown in FIGS. 1-3), or can be arranged physically as a three dimensional array of battery cells 110. For example, the battery cells 110 can be arranged in an array formation having three values, such as a length value 160, a height value (or depth value) 165, and a width value 170 to form the battery block 105 or battery module 100. As depicted in FIG. 1, the battery module 100 can have a dimension of length 160×width 170×height 165. The battery module 100 can have a length value 160 of 200 mm, a width value 170 of 650 mm, and a height value 165 of 100 mm. The length 160 may range from 25 mm to 700 mm. The width 170 may range from 25 mm to 700 mm. The height value 165 (or depth) may range from 65 mm to 150 mm. The height 165 of the battery block 105 or battery module 100 may correspond to (or be dictated by) the height or longest dimension of a component the battery cell 110.

The plurality of battery cells 110 can be enclosed in the battery block 105. The battery block 105 can be formed in a variety of different shapes, such as but not limited to, a rectangular shape, a square shape or a circular shape. The battery block 105 can be formed having a tray like shape and can include a raised edge or border region. The battery cells 110 can be held in position by the raised edge or border region of the battery block enclosure. The battery block 105 can be formed such that it at least partially surrounds or encloses each of the battery cells 110. The battery block 105 can be less than 1 cubic feet in volume (e.g., less than 0.15 cubic feet). For example, the battery block 105 can be less than 0.05 cubic feet in volume.

The battery cells 110 can be provided or disposed in the first and second battery blocks 105 and can be arranged in one or more rows and one or more columns of battery cells 110. Each of the rows or columns of battery cells 110 can include the same number of battery cells 110 or they can include a different number of battery cells 110. The battery cells 110 can be arranged spatially relative to one another to reduce overall volume of the battery block 105, to allow for minimum cell to cell spacing (e.g., without failure or degradation in performance), or to allow for an adequate number of vent ports. The rows of battery cells 110 can be arranged in a slanted, staggered or offset formation relative to one another (see FIG. 3). The battery cells 110 can be placed in various other formations or arrangements.

Each of the battery cells 110 in a common battery block 105 (e.g., same battery block 105) can be spaced from a neighboring or adjacent battery cell 110 in all directions by a distance that ranges from 0.5 mm to 3 mm (e.g., 1.5 mm spacing between each battery cell 110, 2 mm spacing between each battery cell 110). The battery cells 110 in a common battery block 105 can be uniformly or evenly spaced. For example, each of the battery cells 110 can be spaced the same distance from one or more other battery cells 110 in the battery blocks 105. One or more battery cells 110 in a common battery block 105 can be spaced one or more different distances from another one or more battery cells 110 of the common battery block 105. Adjacent battery cells 110 between different battery blocks 105 can be spaced a distance in a range from 2 mm to 6 mm. The distances between the battery cells 110 of different battery blocks 105 can vary across applications and configurations, and can be selected based at least in part on the dimensions of the battery blocks 105, electrical clearance or creepage specifications, or manufacturing tolerances for the respective battery module 100.

The battery block 105 can provide a battery block capacity of up to 300 Ampere-hour (Ah) or more. The battery block 105 can provide varying capacity values. For example, the battery block 105 can provide a capacity value that corresponds to a total number of cylindrical battery cells 110 in the plurality of cylindrical battery cells 110 forming the respective battery block 105. For example, the battery block 105 can provide a battery block capacity in a range from 8 Ah to 600 Ah.

The battery blocks 105 can have a variety of different shapes. For example, the shape of the battery blocks 105 can be determined or selected to accommodate a battery module 100 or battery pack within which a respective battery block 105 is to be disposed. The battery blocks 105 can have, for example, a square shape, rectangular shape, circular shape, or a triangular shape. Battery blocks 105 in a common battery module 100 can have the same shape or one or more battery blocks 105 in a common battery module 100 can have a different shape from one or more other battery blocks 105 in the common battery module 100.

The integrated current collector device 115 can be built or shaped to conform to (or form a part of) the shape and structure of the battery block 105. For example, the integrated current collector device 115 can form a top portion of the battery block 105. One or both cell holder s can be built or shaped to conform to (or form portions of) the shape and structure of the battery block 105. For example, one of the cell holder s (e.g., cell holder 225 in FIG. 2) can form a top portion of the battery block 105, and the other cell holder (e.g., cell holder 230 in FIG. 2) can form a bottom portion of the battery block 105.

The battery module 100 can include a single battery block 105 or multiple battery blocks 105 (e.g., two battery blocks 105, or more than two battery blocks 105). The number of battery blocks 105 in a battery module 100 can be selected based at least in part on a desired capacity, configuration or rating (e.g., voltage, current) of the battery module 100 or a particular application of the battery module 100. For example, a battery module 100 can have a battery module capacity that is greater than the battery block capacity forming the respective battery module 100. The battery module 100 can have a battery module voltage greater than the voltage across the battery block terminals of the battery block 105 within the respective battery module 100. The battery blocks 105 can be positioned adjacent to each other, next to each other, stacked, or in contact with each other to form the battery module 100. For example, the battery blocks 105 can be positioned such that a side surface of the first battery block 105 is in contact with a side surface of the second battery block 105. The battery module 100 may include more than two battery blocks 105. For example, the first battery blocks 105 can have multiple side surfaces positioned adjacent to or in contact with multiple side surfaces of other battery blocks 105. Various types of connectors can couple the battery blocks 105 together within the battery module 100. The connectors may include, but not limited to, straps, wires, ribbonbonds, adhesive layers, or fasteners. The electrical connections between battery blocks 105 and battery modules 100 can use aluminum or copper busbars (stamped/cut metallic pieces in various shapes) with fasteners, wires and ribbons (aluminum, copper, or combination of the two), press fit studs and connectors with copper cables, or bent/formed/stamped copper or aluminum plates.

The first and second battery blocks 105 can each include an integrated current collector device 115. For example, a first integrated current collector device 115 (e.g., multi-layered current collector) is coupled with the first battery block 105 and a second integrated current collector device 115 (e.g., multi-layered current collector) is coupled with the second battery block 105. The first and second integrated current collectors 115 can include or be formed as a multi-layer current collector having at least one positive current collector layer (e.g., first current collector 205 of FIG. 2), at least one negative current collector layer (e.g., second current collector 215 of FIG. 2), and at least one isolation layer (e.g., isolation layer 210 of FIG. 2) disposed between the positive current collector layer and the negative current collector layer. The integrated current collector 115 can be coupled with, disposed within, or embedded in a first cell holder. The first and second integrated current collector devices 115 are each coupled with a plurality of battery cells 110. For example, the first integrated current collector device 115 is coupled with a first plurality of battery cells 110 and the second integrated current collector device 115 is coupled with a second plurality of battery cells 110.

Sense lines 130 can be coupled with, disposed on, or embedded into the first and second integrated current collectors 115 or into the a cell holder coupled with or formed as a component of the first and second integrated current collectors 115. The sense lines 130 can be coupled with, disposed on, or embedded during or after a molding procedure to form the first and second integrated current collectors 115. The sense lines 130 can be coupled with a positive current collector (e.g., first current collector 205 of FIG. 2) and a negative current collector (e.g., second current collector 215 of FIG. 2) and can be used for measuring battery information that is being collected by a battery management unit (BMU) 140.

The BMU 140 can be coupled with the sense lines 130 through a BMU wire 145. The BMU 140 can include a processor or computer module and be configured to measure information or data corresponding to the battery module 100 and the different components or layers of the first battery block 105 and the second battery block 105. For example, the BMU 140 can request, receive, or measure battery information such as but not limited to temperate data, current sensor data, or voltage data corresponding to the battery module 100 and the different components or layers of the first battery block 105 and the second battery block 105. The BMU 140 can be a separate component from the battery module 100 as depicted in FIG. 1 or the BMU 140 can be formed in or embedded within the isolation layer (e.g., isolation layer 210) of the integrated current collector 115. For example, the isolation layer 210 can incorporate the BMU 140 into the single structure during the injection molding. The BMU 140 can include or be coupled with at least one of a temperature sensor, a current sensor or a voltage sensor into the single structure during the injection molding.

The sense lines 130 can include conductive material, such as but not limited to, wires, cables, connection traces, transmission lines, bus or other forms of signal paths formed on or embedded into the first and second integrated current collectors 115. The sense lines 130 can be embedded into the first current collector 205 or the second current collector 215. For example, the sense lines 130 can be embedded into a plastic isolation portion or over-mold portion of the first current collector 205 or the second current collector 215. The sense lines 130 can be used for monitoring data such as temperature data and voltage data. Connections between the sense lines 130 to the first current collector 205 or the second current collector 215 for voltage data or temperature data can be made through direct contact as part of the over-mold integration or other techniques such as wire bonding or laser welding. The conductive material can include an alloy or a metal, such as aluminum or copper.

The integrated current collector device 115 can be molded or otherwise fabricated as a single part that includes cell containment structures (e.g., first cell holder 225, second cell holder 230), current collectors (e.g., first current collector 205 of FIG. 2, second current collector 215 of FIG. 2), and can include sense lines 130. Such an integrated current collector device 115 can be referred as an integrated cell holder. For example, during assembly, a human operator or machine can receive an integrated cell holder and can insert the battery cells to the single integrated cell holder to form a battery cell block (e.g., instead of assembling the battery cells to a variety of different components to form a battery cell block). This assembly process can place the battery cell block to be ready for welding to connect battery cell terminals to appropriate current collectors. Each of the sense lines 130 can be embedded in the integrated cell holder, and can be used to measure voltage or temperature of the battery block as a quality check, during and after welding. Thus, the single, integrated current collector device 115 can serve multiple functions and can be assembled to battery cells within a single stage, instead of designing separate parts that attach to the battery cells at separate stages in the assembly process. This single part design can decrease part count, and can lower PPM defect defects rate and can increase part quality. Moreover, the embedded sense lines can allow for battery monitoring during welding and can identify issues and defect(s) at an early stage of assembly. This is in contrast with technology that solders a sense line to current collectors after welding, that would not have the same capability to attach the associated battery block to a BMU 140 during welding and to identify issues at an early stage.

FIG. 2, among others, provides a partially exploded view of an example battery block 105 having a plurality of battery cells 110 disposed between a first cell holder 225 and a second cell holder 230, and illustrating the different layers or components of the integrated current collector 115. For example, the integrated current collector 115 includes a first current collector 205, an isolation layer 210, and a second current collector 215. The integrated current collector 115 can be coupled with, disposed within, or embedded in the first cell holder 225.

The first cell holder 225 or the second cell holder 230 can include a plurality of layers (e.g., conductive layers, non-conductive layers) that couple the plurality of battery cells 110 with each other. Each of the first cell holder 225 and the second cell holder 230 can include alternating or interleaving layers of conductive layers and non-conductive layers. For example, the second cell holder 230 may include a positive conductive layer, an isolation layer having a non-conductive material, and a negative conductive layer. The first current collector 205 and the second current collector 215 can be formed from an electrically conductive material, and can be molded with the isolation layer 210 (e.g., electrically nonconductive material) to form a single, integrated current collector device 115 (e.g., monolithic device).

The first cell holder 225 and the second cell holder 230 can house, support, hold, position, or arrange the battery cells 110 to form the first or second battery blocks 105 and may be referred to herein as structural layers. For example, the first cell holder 225 and the second cell holder 230 can hold the battery cells 110 in predetermined positions or in a predetermined arrangement to provide the spatial separation (e.g., spacing) described herein between each of the battery cells 110. The battery cells 110 can be evenly spaced with respect to a surface of the first cell holder 225 or the second cell holder 230. The first cell holder 225 can couple with or be disposed on or over a top surface of each of the battery cells 110. The second cell holder 230 can couple with or contact a bottom surface of the each of the battery cells 110.

The cell holder s 225, 230 can provide spatial separation between adjacent battery cells 110 of less than 1 mm (or less than 1.2 mm, or less than 2 mm, or other predetermined value or range). Adjacent battery cells 110 can refer to closest neighbor cell pairs. Spatial separation may be uniform across adjacent cell pairs or may vary across certain groups of cell pairs. The arrangement of battery cells 110 within the battery block 105, including the spatial separation between adjacent battery cells 110, can provide a volumetric energy density that is higher than that of single battery cell 110 implementations. The spatial separation between adjacent battery cells 110 can allow for suitable or sufficient thermal dissipation between battery cells 110, or avoidance of electrical arcing between battery cells 110, and possibly other protective features.

The cell holder s 225, 230 can incorporate structures, such as channels 150 or routing vents, to receive, direct or release high energy or high pressure gaseous release. For example, a plurality of channels 150 can be formed in the integrated current collector device 115, the first cell holder 225, or the second cell holder 230 to vent gaseous release from the plurality of battery cells. The channels 150 or routing vents can receive gaseous release through vents incorporated in the battery cells 110, for instance by coupling to these vents. The cell holder s 225, 230 can include material that is suitably thermally conductive, to transfer, propagate or dissipate heat resulting from the battery cells 110.

FIG. 2 includes an example view of different layers of the first cell holder 225. In particular, FIG. 2 shows a second surface (e.g., bottom surface) of a first conductive layer 205 disposed over, coupled with, or in contact with a first surface (e.g., top surface) of a non-conductive layer 210. A second surface (e.g., bottom surface) of the non-conductive layer 210 is disposed over, coupled with, or in contact with a first surface (e.g., top surface) of a second conductive layer 215. A second surface (e.g., bottom surface) of the second conductive layer 215 is disposed over, coupled with, or in contact with a first surface (e.g., top surface) of the first cell holder 225.

In one example, the first cell holder 225 can hold, house or align the first conductive layer 205, the non-conductive layer 210, and the second conductive layer 215. For example, the first cell holder 225 can include a border or raised edge formed around a border of the first cell holder 225 such that the first conductive layer 205, the non-conductive layer 210, and the second conductive layer 215 can be disposed within the border or raised edge. The border or raised edge formed around a border of the first cell holder 225 can hold the first conductive layer 205, the non-conductive layer 210, and the second conductive layer 215 in place and in physical contact with each other. The first cell holder 225, the first conductive layer 205, and the second conductive layer 215 (with or without the non-conductive layer 210) can be molded or incorporated into a single part or device (e.g., integrated current collector device 115) using the non-conductive material. The non-conductive material can form the non-conductive layer 210 during the molding process. The molding process can include or use at least one of injection molding, block molding, compression molding, gas assist molding, structural foam molding, thermoforming, rotational molding, film insert molding, and casting process.

The first conductive layer 205, the non-conductive layer 210, the second conductive layer 215, the first cell holder 225, and the second cell holder 230 can include a plurality of apertures 240, 245, 250, 255, 260, respectively. The number of apertures 240, 245, 250, 255, 260 can be selected based in part on the size and dimensions of the first conductive layer 205, the non-conductive layer 210, the second conductive layer 215, the first cell holder 225, the second cell holder 230, and the battery cells 110. For example, the first conductive layer 205 can include a first plurality of apertures 240 having a first shape. The non-conductive layer 210 can include a second plurality of apertures 245 having a second shape. The second conductive layer 215 can include a third plurality of apertures 250 having a third shape. The first cell holder 225 can include a fourth plurality of apertures 255 having a fourth shape. The second cell holder 230 can include a fourth plurality of apertures 260 having a fifth shape. The apertures 240, 245, 250, 255, 260 can include an opening or hole formed through each of the respective layers, or a recess formed into the respective layers or structures. The apertures 240, 245, 250, 255, 260 can be aligned with respect to each other (or with a battery cell) within a battery block 105. One or more of the apertures 240, 245, 250, 255 can extend through multiple layers (e.g., through the first conductive layer 205, the non-conductive layer 210, the second conductive layer 215, and the first cell holder 225). For example, the apertures 240, 245, 250, 255 can collectively form an extended aperture from a top surface to a bottom surface of the integrated current collector device 115 for instance. Two or more of the apertures 240, 245, 250, 255 can be maintained, aligned, connected, extended, implemented or formed as an extended aperture during the molding process (e.g., using alignment structures or casts). Part of the nonconductive material used in the molding process can be used to form one or more portions of the extended aperture (e.g., at a top surface and a bottom surface of the integrated current collector device 115).

The shape, dimensions, or geometry of one or more of the first plurality of apertures 240, the second plurality of apertures 245, the third plurality of apertures 250, the fourth plurality of apertures 255, and the fifth plurality of apertures 260 can be different. The shape, dimensions, or geometry of one or more of the first plurality of apertures 240, the second plurality of apertures 245, the third plurality of apertures 250, the fourth plurality of apertures 255, and the fifth plurality of apertures 260 can be the same or substantially similar. Two or more of the first, second, third, fourth and fifth shapes can be conformed at least in part relative to one other. Two or more of the first, second, third, fourth and fifth pluralities of apertures can be aligned relative to one other. The shape, dimensions, or geometry of the apertures 240, 245, 250, 255, 260 can be determined based at least in part on the shape, dimensions, or geometry of the battery cells 110. For example, the plurality of battery cells 110 can be disposed or positioned between a second surface (e.g., bottom surface) of the first cell holder 225 and a first surface (e.g., top surface) of the second cell holder 230. The first cell holder 225 or the second cell holder 230 can hold, house or align the plurality of battery cells 110 using the fourth plurality of apertures 255 or the fifth plurality of apertures 260, respectively. For example, each of the battery cells 110 can be disposed within the battery block 105 such that a bottom end or bottom portion of a battery cell 110 is disposed in, coupled with or on contact with at least one aperture of the fifth plurality of apertures 260 formed in the second cell holder 230, and a top end or top portion of a battery cell 110 is disposed in, coupled with or on contact with at least one aperture of the fourth plurality of apertures 255 formed in the first cell holder 225.

The apertures 240, 245, 250 of the first conductive layer 205, the non-conductive layer 210, and the second conductive layer 215 (as part of the integrated current collector device 115) can allow a connection to a positive layer (e.g., first conductive layer 205) or negative layer (e.g., second conductive layer 215) from each of the battery cells 110. For example, a wirebond (e.g., wirebond 305 of FIG. 3) can extend through the apertures 240, 245, 250 to couple a positive terminal or surface of a battery cell 110 with the first conductive layer 205. Thus, the apertures 240, 245, 255 can be sized to have a diameter or opening that is greater than a diameter or cross-sectional shape of the wirebond 305. A negative tab (e.g., negative tab 310 of FIG. 3) can extend from the second conductive layer 215 and be connected to negative surfaces or terminals on at least two battery cells 110. Thus, the apertures 240, 245, 250 can be sized to have dimensions that are greater than the dimensions of the negative tab 310, or greater than a diameter or cross-sectional shape of the wirebond. For example, a wirebond can extend from the negative tab to couple with a portion of a negative terminal on a battery cell 110 that is exposed by the aperture 250. Thus, one or more of the apertures 240, 245, 250 can be sized to have dimensions that are greater than the dimensions of the negative tab, or greater than a diameter or cross-sectional shape of the wirebond. The shape of the apertures 240, 245, 250, 255, 260 can include a round, rectangular, square, or octagon shape or form as some examples. The dimensions of the apertures 240, 245, 250, 255, 260 can include a width of 21 mm or less for instance. The dimensions of one or more of the apertures 240, 245, 250, 255, 260 can be 12 mm in width and 30 mm in length for example.

The apertures 240, 245, 250 can be formed such that they are smaller than the apertures 255, 260. For example, the apertures 255 and 260 can have a diameter in a range from 10 mm to 35 mm (e.g., 18 mm to 22 mm). The apertures 240, 245, 250 can have a diameter in a range from 3 mm to 33 mm. If the apertures 255, 260 are formed having a square or rectangular shape, the apertures 255, 260 can have a length in a range from 4 mm to 25 mm (e.g., 10 mm). If the apertures 255, 260 are formed having a square or rectangular shape, the apertures 255, 260 can have a width in a range from 4 mm to 25 mm (e.g., 10 mm). For example, the apertures 255, 260 can have dimensions of 10 mm×10 mm. If the apertures 240, 245, 250 are formed having a square or rectangular shape, the apertures 240, 245, 250 can have a length in a range from 2 mm to 20 mm (e.g., 7 mm). If the apertures 240, 245, 250 are formed having a square or rectangular shape, the apertures 240, 245, 250 can have a width in a range from 2 mm to 20 mm (e.g., 7 mm). For example, the apertures 240, 245, 250 can have dimensions of 7 mm×7 mm.

Apertures 245 can be formed such that they are smaller (e.g., have smaller dimensions) or offset with respect to apertures 240. For example, apertures 245 can correspond to apertures 240, such as having the same geometric shape with just an offset to make the apertures 245 smaller with respect to apertures 240. For example, the offset can be in a range from 0.1 mm to 6 mm depending on isolation, creepage, and clearance requirements. Apertures 245 can be sized the same as or identical to aperture 240.

The apertures 240, 245, 250 can be formed in a variety of shapes. For example, the apertures 240, 245, 250 may not be formed as distinct patterned openings or formed having distinct patterned openings. For example, the apertures 240, 245, 250 can be formed as a geometric cut from the sides of the respective one of layers 205, 210, 215. The apertures 240, 245, 250 can be formed as half circular cutouts around the perimeter of each of the respective one of layers 205, 210, 215, respectively.

The first conductive layer 205 and the second conductive layer 215 can include an electrically conductive material, a metal (e.g., copper, aluminum), or a metallic material. The first conductive layer 205 can be a positive conductive layer or positively charged layer. The second conductive layer 215 can be a negative conductive layer or negatively charged layer. The first conductive layer 205 and the second conductive layer 215 can have a thickness in a range of 0.1 to 8 millimeters (e.g., 1.5 mm). For example, the first current collector 205 or the second current collector 215 can include or be made of a thin conductive metal (e.g., of less than 5 millimeter in thickness, although other dimensions are contemplated) or metal layer. The first conductive layer 205 and the second conductive layer 215 can have the same length as battery block 105. The first conductive layer 205 and the second conductive layer 215 can have the same width as battery block 105.

The first current collector 205 can be made of a metal such as copper or aluminum, and can be affixed or mounted (e.g., directly) on a battery cell. The first current collector 205 can be designed or implemented with precise cut-outs or apertures 240 whereby a positive terminal connection can be made by welding from the positive wirebond to the first current collector 205 (e.g., a top surface portion of the first current collector 205, or an edge surface portion of a corresponding aperture 240). The first current collector 205 can be designed or implemented with partial cut-outs or partially-formed apertures 240 at or along one or more edges of the layer, to expose at least one positive terminal of the battery cells 110 through the layer. The second current collector 215 can be designed or implemented with precise cut-outs or apertures 250 where a wirebond head can touch the rim of the battery cell 110 and bond to the second current collector 215. The second current collector 215 can be designed or implemented with partial cut-outs or partially-formed apertures 250 at or along one or more edges of the layer, to expose at least one positive terminal of the battery cells 110 through the layer. The second current collector 215 can be designed or implemented to support resistive welding for instance, in which a bondhead can contact the second current collector 215 directly and weld to the rim to make a negative terminal connection.

A portion of the isolation layer 210 can be disposed or located above the second current collector 215 to provide isolation from the first current collector 205. The isolation layer 210 (or non-conductive layer) can include insulation material, plastic material, epoxy material, FR-4 material, polypropylene materials, or formex materials. The dimensions or geometry of the non-conductive layer 210 can be selected to provide a predetermined creepage, clearance or spacing (sometimes referred to as creepage-clearance specification or requirement) between the first conductive layer 205 and the second conductive layer 215. For example, a thickness or width of the non-conductive layer 210 can be selected such that the first conductive layer 205 is spaced at least 3 mm from the second conductive layer 215 when the non-conductive layer 210 is disposed between the first conductive layer 205 and the second conductive layer 215. The non-conductive layer 210 can be formed having a shape or geometry that provides the predetermined creepage, clearance or spacing. For example, the non-conductive layer 210 can have a different dimension than that the first conductive layer 205 and the second conductive layer 215, such that an end or edge portion of the non-conductive layer 210 extends out farther (e.g., longer) than an end or edge portion of the first conductive layer 205 and the second conductive layer 215 relative to a horizontal plane or a vertical plane. The distance that an end or edge portion of the non-conductive layer 210 extends out can provide the predetermined creepage, clearance or spacing (e.g., 3 mm creepage or clearance). The thickness and insulating structure of the non-conductive layer 210, that separate the first conductive layer 205 from the second conductive layer 215, can provide the predetermined creepage, clearance or spacing. Thus, the dimensions of the non-conductive layer 210 can be selected, based in part, to meet creepage-clearance specifications or requirements. The dimensions of the non-conductive layer 210 can reduce or eliminate arcing between the first conductive layer 205 and the second conductive layer 215. The non-conductive layer 210 can have a thickness that ranges from 0.1 mm to 8 mm (e.g., 1 mm). The non-conductive layer 210 can have the same width as the battery block 105. For example, the non-conductive layer 210 can have a width in a range from 25 mm to 700 mm (e.g., 330 mm). The non-conductive layer 210 can have the same length as the battery block 105. For example, the non-conductive layer 210 can have a length in a range from 25 mm to 700 mm (e.g., 150 mm).

The material and structural configuration of the cell holders 225, 230 can provide spatial separation between cells such that creepage or clearance (creepage-clearance) requirements are met or exceeded for supporting a certain voltage across terminals of a battery pack 440 (e.g., 400 V, or 450 V) or of a battery module 100 (e.g., 60 V) that is implemented using the battery blocks 105. Creepage can refer to a separation (e.g., shortest distance) between connection or weld points between (e.g., like-terminals of) battery cells 110 as measured along a surface of a bus-bar, circuit board or other connecting structure. Clearance can refer to a separation (e.g., shortest distance) between connection or weld points between (e.g., like-terminals of) battery cells 110 as measured through air or space.

The first cell holder 225, the second cell holder 230 and the non-conductive layer 210 can include or be molded from an electrically nonconductive, flame retardant material, for example to provide rigid open slots to hold the battery cells 110. The first cell holder 225 and the second cell holder 230 can have a flame resistance rating (e.g., FR rating) of UL 94 rating of V-0 or greater. For example, the first holder 225 or the second cell holder 230 can have a UL 94 (e.g., plastics flammability of plastic materials) rating of V-0 that corresponds to a thickness of a wall portion of the respective layer. The thinner a wall thickness is the more difficult it can be to achieve a V-0 rating. Thus, the first cell holder 225 or the second cell holder 230 can have a thickness between 0.5 mm to 2.5 mm. The first cell holder 225 and the second cell holder 230 can include plastic material, acrylonitrile butadiene styrene (ABS) material, polycarbonate material, or nylon material (e.g., PA66 nylon) with glass fill for instance. The rigidity of first cell holder 225 and the second cell holder 230 can correspond to the material properties forming the respective first cell holder 225 and the second cell holder 230, such as flexural modulus.

The non-conductive layer 210 can include an isolation material or nonconductive material having high dielectric strength that can provide electrical isolation. The isolation material can have a dielectric strength ranging from 250V/mil to 350V/mil. For example, the isolation material or nonconductive material can have a dielectric strength of 300V/mil (other values or ranges of the values are possible).

The non-conductive material can hold the first current collector 205 and the second current collector 215 together or in place. The nonconductive material can have a tensile strength ranging from 8,000 psi to 10,000 psi. For example, the first cell holder 225 and the second cell holder 230 can have a tensile strength of 9,000 psi (other values or ranges of the values are possible). The nonconductive material can have a flexural modulus (e.g., stiffness/flexibility) ranging from 350,000 psi to 450,000 psi. For example, the first cell holder 225 and the second cell holder 230 can have a flexural modulus (e.g., stiffness/flexibility) of 400,000 psi (other values or ranges of the values are possible). The values for the dielectric strength, tensile strength, or flexural modulus can vary outside these values or range of values and can be selected based in part on a particular application or specification of the first cell holder 225 and the second cell holder 230 for instance.

The non-conductive layer 210 can provide or include a conformal coating or lamination layer that protects against shorting from the first current collector 205 and the second current collector 215 (e.g., the positive and negative current collectors), and can expose weld areas (e.g., for welding to battery cell terminals). This design can support different weld techniques, such as wire bonding or laser welding (e.g., for the negative connections).

For example, using the single sided weld approach discussed herein, the positive and negative terminal connections to the first current collector 205 and the second current collector 215, respectively, can be made from the same end of the battery cell 110 at which the rim 220 (e.g., top cap) is located. The rim 220, edge or other portion of the top cap assembly can form or provide a negative terminal and can be welded to a current collector for negative collections. Welding can be performed to for example a narrow and non-flat (protruded) profile of the rim 220 at the top cap (e.g., along the round edge that extends into the cylindrical surface of the battery cell), to connect the negative terminal to a portion of a current collector for negative collections. For example, welding can be performed to connect the negative terminal to an aperture edge (e.g., of a tabbed or protruded portion of the aperture), or an upper surface portion (e.g., of a tabbed or protruded portion of the aperture) of the current collector (e.g., negative current collector) for negative collections. The positive terminal tab portion of the top cap can be connected to a portion of a current collector (e.g., first current collector) for positive collections. For example, welding can be performed to an aperture edge or top surface portion of the current collector for positive collections. Hence, in accordance with the concepts disclosed herein, a current collector configuration is provided that can support positive and negative weld connections at the top cap end, that can support one or more methods for welding, that can support tool access (e.g., for welding, assembly), and that can provide isolation between the negative and positive current collectors.

The term weld is sometimes used herein by way of illustration (e.g., in resistive/laser welding or electrically connecting a current collector to a terminal), and is not intended to be limiting in any way to a specific manner of connection. As disclosed herein, the term weld is sometimes used interchangeably with connect or bond (e.g., wirebond 305). For example, the wirebond 305 can include a first end that is welded, connected, or bonded with a surface of a battery cell 110 and a second end that is welded, connected, or bonded with a conductive positive layer 205. The negative tab 310 can include a first end that is welded, connected, or bonded with a surface of at least two battery cells 110 and a second end that is welded, connected, or bonded with a conductive negative layer 215.

Each of the plurality of battery cells 110 can be cylindrical in shape or structure. The battery cell 110 can have a top cap or rim 220. The rim 220 can include, incorporate or hold a tab or conductive structure located within or at a center of the top cap that forms a positive electrical terminal of the battery cell 110. The battery cell 110 can be formed from a metallic or conductive housing. The housing or outer surface may operate as the main casing for the battery cell 110. The can may comprise a surface structure that forms a negative electrical terminal of the battery cell 110. FIG. 2 shows multiple ones of an example embodiment of a cylindrical battery cell 110. Depending on the shape of each battery cell 110, the battery cells 110 can be arranged spatially relative to one another to reduce overall volume of the battery block 105, to allow for minimum cell to cell spacing (e.g., without failure or degradation in performance), or to allow for an adequate number of vent ports. For instance, the rows of battery cells 110 can be arranged in a slanted or offset formation relative to one another. The battery cells 110 can be placed in various other formations or arrangements.

FIG. 3, among others, depicts a top view of the battery module 100 illustrating an example arrangement of the battery cells 110 in each of the first battery block 105 and the second battery block 105. The battery blocks 105 can include a pair of terminals 330, 335. For example, the battery blocks 105 include a first battery block terminal 330 and a second battery block terminal 335. The first battery block terminal 330 can correspond to a positive terminal and the second battery block terminal 335 can correspond to a negative terminal The plurality of cylindrical battery cells 110 can provide a battery block capacity to store energy that is at least five times greater than a battery cell capacity of each of the plurality of cylindrical battery cells 110. The battery blocks 105 can have a voltage of up to 5 volts across the pair of battery block terminals 330, 335. For example, the first battery block terminal 330 can be coupled with 5 V and the second battery block terminal 335 can be coupled with 0 v. The first battery block terminal 330 can be coupled with +2.5 V and the second battery block terminal 335 can be coupled with −2.5 V. Thus, a difference in voltage between the first battery block terminal 330 and the second battery block terminal 335 can be 5 V or up to 5 V.

The battery cells 110 in the first and second battery blocks 105 can be arranged in one or more rows and one or more columns of battery cells 110. The individual battery cells 110 can be cylindrical cells or other types of cells. Depending on the shape of each battery cell 110, the battery cells 110 can be arranged spatially relative to one another to reduce overall volume of the battery block 105, to minimize cell to cell spacing (e.g., without failure or degradation in performance), or to allow for an adequate number of vent ports. For instance, FIG. 3, among others, shows each row of battery cells 110 arranged in a slanted or offset formation relative to one another. The battery cells 110 can be placed in various other formations or arrangements.

The battery cells 110 in a common battery block 105 can be uniformly spaced, evenly spaced or one or more battery cells 110 in a common battery block 105 can be spaced one or more different distances from another one or more battery cells 110 of the common battery block 105. Each of the battery cells 110 in a common battery block 105 (e.g., same battery block 105) can be spaced from a neighboring or adjacent battery cell 110 in all directions by a distance that ranges from 0.5 mm to 3 mm (e.g., 1.5 mm spacing between each battery cell 110, 2 mm spacing between each battery cell 110). For example, a first battery cell 110 can be spaced a distance of 1.5 mm from a neighboring second battery cell 110 and spaced a distance of 1.5 mm from a neighboring third battery cell 110. The battery cells 110 in a common battery block 105 can be uniformly spaced, or evenly spaced. One or more battery cells 110 in a common battery block 105 can be spaced one or more different distances from another one or more battery cells 110 of the common battery block 105. Depending on the shape of each battery cell 110, the battery cells 110 can be arranged spatially relative to one another to reduce overall volume of the battery block 105, to allow for minimum cell to cell spacing (e.g., without failure or degradation in performance), or to allow for an adequate number of vent ports. For instance, each row of battery cells 110 can be arranged in a slanted or offset formation relative to one another. The battery cells 110 can be placed in various other formations or arrangements.

The battery cells 110 (e.g., adjacent battery cells 110) between different battery blocks 105 (e.g., adjacent battery blocks 105) can be spaced a distance in a range from 2 mm to 6 mm. For example, one or more battery cells 110 disposed along an edge of a first battery block 105 can be spaced a distance in a range from 0 mm to 1 mm (e.g., 0.5 mm) from the edge of the first battery block 105 and one or more battery cells 110 disposed along an edge of a second battery block 105 can be spaced a distance in a range from 0 mm to 1 mm (e.g., 0.5 mm) from the edge of the second battery block 105. The edges of the first and second battery blocks 105 can be coupled with each other, in contact with each other, or facing each other such that the one or more battery cells 110 disposed along the edge of the first battery block 105 are spaced from the one or more battery cells 110 disposed along the edge of the second battery block 105 a distance in a range from 2 mm to 6 mm (e.g., 4.5 mm). The distances between the battery cells 110 of different battery blocks 105 can vary and can be selected based at least in part on the dimensions of the battery blocks 105, electrical clearance or creepage specifications, or manufacturing tolerances for the respective battery module 100. For example, battery cells 110 can be spaced a distance from a second, different battery cell 110 based on predetermined manufacturing tolerances that may control or restrict how close battery cells 110 can be positioned with respect to each other.

The battery cells 110 can each couple with a first layer 205 (e.g., positive conductive layer) of the first cell holder 225. For example, the first cell holder 225 can include multiple layers, such as, a first layer forming a positive current collector 205, an isolation layer 210 having non-conductive material, and a second layer forming negative current collector 215. Each of the battery cells 110 can include a pair of battery cell terminals 320, 325. For example, the battery cells 110 can include a positive terminal 320 and a negative terminal 325. The pair of terminals 320, 325 of each of the battery cells 110 can have up to 5 V across their respective terminals. For example, the positive terminal 320 can be coupled with +5 V and the negative terminal 325 can be coupled with 0 V. The positive terminal 320 can be coupled with +2.5 V and the negative terminal 325 can be coupled with −2.5 V. Thus, the difference in voltage between the positive terminal 320 and the negative terminal 325 of each battery cell 110 can be 5 V or in any value up to and including 5 V.

The positive terminal 320 of a battery cell 110 can be connected using a wirebond 305 or otherwise, with the first layer 205 of the first cell holder 225. The negative terminal 325 or negative surface of a battery cell 110 can connect with the second layer 215 of the first cell holder 225 through a negative tab 310. The positive terminal 320 and the negative terminal 325 of a battery cell 110 can be formed on or coupled with at least a portion of the same surface (or end) of the respective battery cell 110. For example, the positive terminal 320 can be formed on or coupled with a first surface (e.g., top surface, side surface, bottom surface) of the battery cell 110 and the negative terminal 325 of the battery cell 110 can be formed on or coupled with the same first surface. Thus, the connections to positive and negative bus-bars or current collectors can be made from the same surface (or end) of the battery cell 110 to simplify the installation and connection of the battery cell 110 within a battery block 105.

The negative tab 310 can couple at least two battery cells 110 with a conductive negative layer 215 of the first cell holder 225. The negative tab 310 can be part of the conductive negative layer 215, for example formed as an extension or structural feature within a plane of the conductive negative layer 215, or partially extending beyond the plane. The negative tab 310 can include conductive material, such as but not limited to, metal (e.g., copper, aluminum), or a metallic alloy or material. The negative tab 310 can form or provide a contact point to couple a battery cell 110 to a negative current collector 215 of the first cell holder 225. The negative tab 310 can couple with or contact a top portion or top surface (e.g., negative terminal 325) of the battery cell 110. The negative tab 310 can couple with or contact a side surface of a battery cell 110. The negative tab 310 can couple with or contact a bottom portion or bottom surface of a battery cell 110. The surface or portion of a battery cell 110 the negative tab 310 couples with or contacts can correspond to the placement of the first cell holder 225 relative to the battery cell 110.

The negative tab 310 can have a shape configured to couple with or contact surfaces of at least two battery cells 110. The negative tab 310 can be formed in a variety of different shapes and have a variety of different dimensions (e.g., conformed to the dimensions of the battery cells 110 and their relative positions). The shape of the negative tab 310 can include, but not limited to, rectangular, square, triangular, octagon, circular shape or form, or one or more combinations of rectangular, square, triangular, or circular shape or form. For example, the negative tab 310 can be formed having one or more sides (e.g., portions or edges)

having a circular or curved shape or form to contact a surface of the battery cells and one or more sides having a straight or angled shape. The particular shape, form or dimensions of the negative tab 310 can be selected based at least in part on a shape, form or dimensions of the battery cells 110 or a shape, form or dimensions of the first cell holder 225. The shape and structure of the negative tab 310 can be formed in two or three dimensions. For example, one or more edges or portions of the negative tab 310 can be folded or formed into a shape or structure suitable for bonding to a negative terminal portion of a battery cell 110. For a two-dimensional negative tab 310 (e.g., a negative tab 310 with a thickness conformed with a thickness of the corresponding conductive negative layer), the negative tab 310 can include or be described with one or more parameters, such as length, a width, surface area, and radius of curvature. For a three-dimensional negative tab 310 (e.g., a negative tab 310 with at least a portion that does not conform with a thickness of the corresponding conductive negative layer), the negative tab 310 can include or be described with one or more parameters, including length, width, height (or depth, thickness), one or more surface areas, volume, and radius of curvature. The three-dimensional negative tab 310 can include a folded, curved or accentuated portion that provides a larger surface for a negative surface of a battery cell 110 to couple with or contact. For example, the three-dimensional negative tab 310 can have a greater thickness than a two-dimensional negative tab 310.

The wirebond 305 can be a positive wirebond 305 that can couple at least one battery cell 110 with a conductive positive layer 205 of the cell holder 225. The wirebond 305 can be formed in a variety of different shapes and have a variety of different dimensions. The particular shape or dimensions of wirebond 305 can be selected based at least in part on a shape or a dimension of the battery cells 110 or a shape or a dimension of the first cell holder 225. For example, the wirebond 305 can be sized to extend from a top surface, side surface or bottom surface of a battery cell 110. As depicted in FIG. 3, the wirebond 305 can extend from a top surface (e.g., a positive terminal 320) of a battery cell 110 and extend through apertures 240, 245, 250 formed in each of the different layers forming the first cell holder 225, to contact a top surface of the conductive positive layer 205 of the cell holder 225. The shape of the wirebond 305 can be selected or implemented so as not to contact a negative layer of the first cell holder 225 as the wirebond 305 extends through the different layers forming the first cell holder 225. The shape or form of the wirebond 305 can include a rectangular shape, cylindrical shape, tubular shape, spherical shape, ribbon or tape shape, curved shape, flexible or winding shape, or elongated shape. The wirebond 305 can include electrical conductive material, such as but not limited to, copper, aluminum, metal, or metallic alloy or material.

Figure 4:
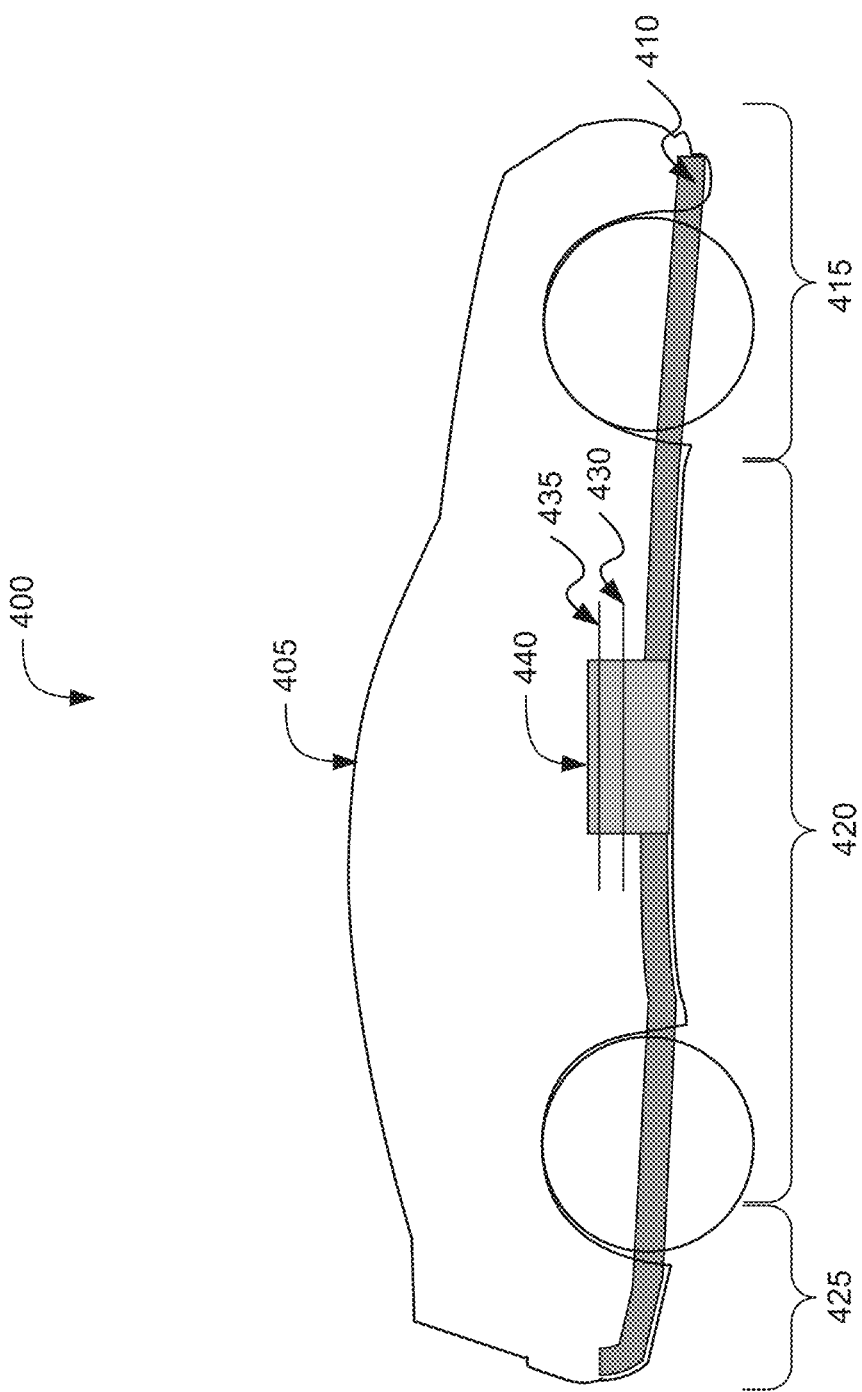
FIG. 4 is a block diagram depicting a cross-sectional view of an example electric vehicle installed with a battery pack.

FIG. 4 depicts a cross-section view 400 of an electric vehicle 405 installed with a battery pack 440. The battery pack 440 can include a plurality of battery modules 100. The plurality of battery modules 100 can include a plurality of battery blocks 105. The battery blocks 105 can include a plurality of cylindrical battery cells 110. Each of the plurality of cylindrical battery cells 110 can include a positive terminal 320 and a negative terminal 325 coupled with an integrated current collector device 115. The battery pack 440 can reside or be disposed within the electric vehicle 405. The electric vehicle 405 can include an autonomous, semi-autonomous, or non-autonomous human operated vehicle. The electric vehicle 405 can include a hybrid vehicle that operates from on-board electric sources and from gasoline or other power sources. The electric vehicle 405 can include automobiles, cars, trucks, passenger vehicles, industrial vehicles, motorcycles, and other transport vehicles. The electric vehicle 405 can include a chassis 410 (sometimes referred to herein as a frame, internal frame, or support structure). The chassis 410 can support various components of the electric vehicle 405. The chassis 410 can span a front portion 415 (sometimes referred to herein a hood or bonnet portion), a body portion 420, and a rear portion 425 (sometimes referred to herein as a trunk portion) of the electric vehicle 405. The front portion 415 can include the portion of the electric vehicle 405 from the front bumper to the front wheel well of the electric vehicle 405. The body portion 420 can include the portion of the electric vehicle 405 from the front wheel well to the back wheel well of the electric vehicle 405. The rear portion 425 can include the portion of the electric vehicle 405 from the back wheel well to the back bumper of the electric vehicle 405.

The battery pack 440 that includes cylindrical battery cells 110 coupled with an integrated current collector device 115 can be installed or placed within the electric vehicle 405. For example, the battery pack 440 can couple with a drive train unit of the electric vehicle 405. The drive train unit may include components of the electric vehicle 405 that generate or provide power to drive the wheels or move the electric vehicle 405. The drive train unit can be a component of an electric vehicle drive system. The electric vehicle drive system can transmit or provide power to different components of the electric vehicle 405. For example, the electric vehicle drive train system can transmit power from the battery pack 440 to an axle or wheels of the electric vehicle 405. The battery pack 440 can be installed on the chassis 410 of the electric vehicle 405 within the front portion 415, the body portion 420 (as depicted in FIG. 4), or the rear portion 425. A first bus-bar 435 and a second bus-bar 430 can be connected or otherwise be electrically coupled with other electrical components of the electric vehicle 405 to provide electrical power from the battery pack 440 to the other electrical components of the electric vehicle 405.

The battery pack 440 can include a battery system having multiple battery modules 100 (e.g., two or more). Multiple battery modules 100 can be electrically coupled with each other to form a battery pack 440, using one or more electrical connectors such as bus-bars. For example, battery blocks 105 can be electrically coupled or connected to one or more other battery blocks 105 to form a battery module 100 or battery pack 440 of a specified capacity and voltage. The number of battery blocks 105 in a single battery module 100 can vary and can be selected based at least in part on a desired capacity of the respective battery module 100. The number of battery modules 100 in a single battery pack 440 can vary and can be selected based at least in part on a desired capacity of the respective battery pack 440. For example, the number of battery modules 100 in a battery pack 440 can vary and can be selected based at least in part on an amount of energy to be provided to an electric vehicle. The battery pack 440 can couple or connect with one or more bus-bars of a drive train system of an electric vehicle to provide electrical power to other electrical components of the electric vehicle (e.g., as depicted in FIG. 4).

The battery blocks 105 and the battery modules 100 can be combinable with one or more other battery blocks 105 and battery modules 100 to form the battery pack 440 of a specified capacity and a specified voltage that is greater than that across the terminals of the battery block 105 or battery module 100. For instance, a high-torque motor may be suitably powered by a battery pack 440 formed with multiple battery cells 110 (e.g., 500 cells), blocks 105 or modules 100 connected in parallel to increase capacity and to increase current values (e.g., in Amperes or amps) that can be discharged. A battery block 105 can be formed with 20 to 50 battery cells 110 for instance, and can provide a corresponding number of times the capacity of a single battery cell 110. A battery pack 440 formed using at least some battery blocks 105 or battery modules 100 connected in parallel can provide a voltage that is greater than that across the terminals of each battery block 105 or battery module 100. A battery pack 440 can include any number of battery cells 110 by including various configurations of battery blocks 105 and battery modules 100.

The battery module 100 or battery pack 440 having one or more battery blocks 105 can provide flexibility in the design of the battery module 100 or the battery pack 440 with initially unknown space constraints and changing performance targets. For example, standardizing and using small battery blocks 105 can decrease the number of parts (e.g., as compared with using individual cells) which can decrease costs for manufacturing and assembly. The battery modules 100 or battery packs 440 having one or more battery blocks 105 as disclosed herein can provide a physically smaller, modular, stable, high capacity or high power device that is not available in today's market, and can be an ideal power source that can be packaged into various applications.

The shape and dimensions of the battery pack 440 can be selected to accommodate installation within an electric vehicle 405. For example, the battery pack 440 can be shaped and sized to couple with one or more bus-bars 430, 435 of a drive train system (which includes at least part of an electrical system) of an electric vehicle 405. The battery pack 440 can have a rectangular shape, square shape, or a circular shape, among other possible shapes or forms. The battery pack 440 (e.g., an enclosure or outer casing of the battery pack 440) can shaped to hold or position the battery modules 100 within a drive train system of an electric vehicle 405. For example, the battery pack 440 can be formed having a tray like shape and can include a raised edge or border region. Multiple battery modules 100 can be disposed within the battery pack 440 can be held in position by the raised edge or border region of the battery pack 440. The battery pack 440 may couple with or contact a bottom surface or a top surface of the battery modules 100. The battery pack 440 can include a plurality of connectors to couple the battery modules 100 together within the battery pack 440. The connections may include, but not limited to, straps, wires, adhesive materials, or fasteners.

The battery blocks 105 can be coupled with each other to form a battery module 100 and multiple battery modules 100 can be coupled with each other to form a battery pack 440. The number of battery blocks 105 in a single battery module 100 can vary and be selected based at least in part on a desired capacity or voltage of the respective battery module 100. The number of battery modules 100 in a single battery pack 440 can vary and be selected based at least in part on a desired capacity of the respective battery pack 440. For instance, a high-torque motor may be suitably powered by a battery pack 440 having multiple battery modules 100, the battery modules 100 having multiple battery blocks 105 and the battery blocks 105 having multiple battery cells 110. Thus, a battery pack 440 can be formed with a total number of battery cells 110 ranging from 400 to 600 (e.g., 500 battery cells 110), with the battery blocks 105 or battery modules 100 connected in parallel to increase capacity and to increase current values (e.g., in Amperes or amps) that can be discharged. A battery block 105 can be formed with any number of battery cells 110 and can provide a corresponding number of times the capacity of a single battery cell 110.

Figure 5:
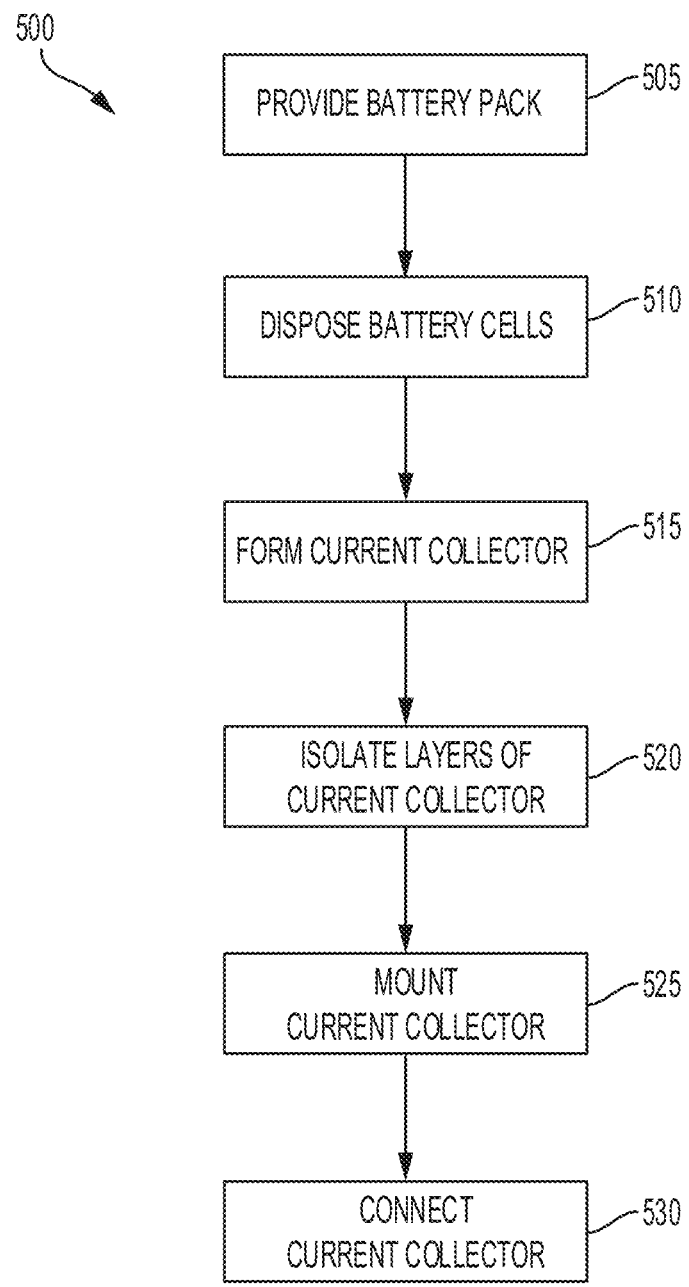
FIG. 5 is a flow diagram depicting an illustrative embodiment of a method for providing a system to power an electric vehicle.

FIG. 5, among others, depicts an example embodiment of a method 500 of providing a system to power electric vehicles 405. The method 500 can include providing a battery pack 440 (ACT 505). The battery pack 440 can be disposed within an electric vehicle 405. The battery pack 440 can be formed having multiple battery modules 100. For example, two or more battery modules 100 can be electrically coupled together to form a battery pack 440. The battery module 100 can be formed by electrically coupling two or more battery blocks 105 together. For example, battery block terminals 330, 335 can electrically couple a first battery block 105 with a second battery block 105 to form at least one battery module 100. The battery blocks 105 can be electrically coupled in series. The battery blocks 105 can be electrically coupled in parallel.

The method 500 can include disposing a plurality of cylindrical battery cells 110 in a battery block 105 (ACT 510). For example, multiple (e.g., two or more) battery cells 110 can be disposed within at least one battery block 105. The battery cells 110 can be disposed such that they are uniformly spaced, evenly spaced within a common battery block 105 or the battery cells 110 can be disposed such that they are spaced one or more different distances from another one or more battery cells 110 of the common battery block 105. For example, the battery cells 110 can be spaced from a neighboring or adjacent battery cell 110 in all directions by a distance that ranges from 0.5 mm to 3 mm (e.g., 1.5 mm spacing between each battery cell 110, 2 mm spacing between each battery cell 110). Battery cells 110 in a common battery block 105 can be spaced one or more different distances from another one or more battery cells 110 of the common battery block 105. Depending on the shape of each battery cell 110, the battery cells 110 can be arranged spatially relative to one another to reduce overall volume of the battery block 105, to allow for minimum cell to cell spacing (e.g., without failure or degradation in performance), or to allow for an adequate number of vent ports. Rows of battery cells can be arranged in a slanted or offset formation relative to one another. The battery cells 110 can be placed in various other formations or arrangements.

The method 500 can include forming an integrated current collector device 115 (ACT 515). For example, an integrated current collector device 115 can be formed via injection molding using an isolation layer 210 (e.g., nonconductive material), by incorporating a first current collector 205 and a second current collector 215 into the integrated current collector device 115 during the injection molding. The isolation layer 210 can bind or otherwise couple the first current collector 205 with the second current collector 215. For example, the isolation layer 210 can include or be coated with an adhesive material to couple with the first current collector 205 on a first surface and couple with the second current collector 215 on a second surface. The integrated current collector device 115 can be formed using various techniques, such as a molding process. The molding process can include or use at least one of injection molding, block molding, compression molding, gas assist molding, structural foam molding, thermoforming, rotational molding, film insert molding, and casting process. For example, the integrated current collector device 115 can be formed via molding using the isolation layer 210, by incorporating a first current collector 205, a second current collector 215, and one or more sense lines 130 into the integrated current collector device 115 during the molding, and providing electrical isolation between the first current collector 205 and the second current collector 215. For example, the isolation layer 210 can be disposed on or over a top surface of the second current collector 215 using various techniques, including but not limited to, injection molding. A first cell holder 225 can be used a mold and hold the second current collector 215 while the material of the isolation layer 210 is disposed on or over a top surface of the second current collector 215. For example, the material of the isolation layer 210 can be provided to or fed into the mold such that the material of the isolation layer 210 forms over a top surface of the second current collector 215. The isolation layer 210 can include a nonconductive material. The mold can include barriers or cutouts regions that correspond to the apertures 240, 245, 255 of the first current collector 205, the isolation layer 210, and second current collector 215, respectively. For example, during the molding process, the materials of the different layers can be provided to or fed into the respective molds and the barriers can prevent the material from forming in regions intended to be apertures for the respective regions. Thus, each of the first current collector 205, the isolation layer 210, and second current collector 215 can be formed having apertures 240, 245, 250, respectively.

During an injection molding process, the first current collector 215 and the second current collector 215 can be integrated first. For example, the first current collector 205 and the second current collector 215 can be individually overmolded to isolate their respective edges and at least one surface of the first current collector 205 or the second current collector 215. In a separate injection molding step, the first current collector 205 and the second current collector 215 can be overmolded into a single assembly in which one or more surface areas of the first current collector 205 and the second current collector 215 can be isolated in plastic or plastic material except the critical welding areas or surfaces of the first current collector 205 or the second current collector 215. The single assembly including the first current collector 205 and the second current collector 215 can be joined with the first cell holder 225 or the second cell holder 230 to complete the integration. The single assembly including the first current collector 205 and the second current collector 215 can be joined with the first cell holder 225 or the second cell holder 230 using, but not limited to, ultrasonic welding, laser welding, adhesive tape, or liquid adhesive. The entire assembly of the battery block 105 can be integrated as a single assembly. For example, instead of an isolation layer 210, the first current collector 205 and the second current collector 215 can be separated as part of the injection molding process by filling the space previously occupied by the isolation layer 210 with a plastic material or molten plastic. An injection mold tool used during the injection molding process can include two or more sections, for example, a cavity side and a core side. The injection mold tools can come together to form a path for the molten plastic to fill. The first current collector 205 and the second current collector 215 can be located in between the cavity side and core side of the injection mold tools and fixed in space in their correct position with respect to the first cell holder 225 or the second cell holder 230. A plastic material or molten plastic can be injected into the injection mold tools and surround the first current collector 205 and the second current collector 215 and cool. Thereby forming an integrated cell holder product that includes at least one nonconductive layer separating the first current collector 205 and the second current collector 215. The concept can be expanded to include other overmolded features such as voltage sense lines 130 or temperature sense lines 130.

The method 500 can include electrically isolating the first current collector 205 from the second current collector 215 using the isolation layer 210 (ACT 520). For example, the isolation layer 210 can be coated or laminated with a laminate material or laminate coating. In forming the integrated current collector 115, the isolation layer 210 can be disposed between the first current collector 205 from the second current collector 215 to separate and electrically isolate the first current collector 205 from the second current collector 215. The isolation layer 210 can protect against shorting from the first and second current collectors 205, 215 (e.g., positive and negative current collectors 205, 215).

One or more sense lines 130 can be formed on a surface or embedded within the first current collector 205. For example, the sense lines 130 can be disposed or embedded within the first current collector 205 using injection molding. The one or more sense lines 130 can couple with or connect to at least one of the first current collector 205 or the second current collector 215. The first current collector 205, the second current collector 215, and the one or more sense lines 130 can comprise at least one conductive material. For example, the sense lines 130 can be formed or embedded within the first current collector 205, the second current collector 215, or both the first current collector 205 and the second current collector 215. The sense lines can include wires configured to provide data or information corresponding to the battery cells 110, the first current collector 205, or the second current collector 215.

Apertures 240, 245, 250 for each of the first current collector 205, second current collector 215, and isolation layer 210 can be aligned. For example, the plurality of apertures 240 of the first current collector 205 can be aligned with respect to the battery cells 110. The plurality of apertures 240 of the first current collector 205 can be aligned to expose positive terminals 320 of the plurality of cylindrical battery cells 110 through the conductive layer a first current collector 205 and couple with at least one surface of the first current collector 205.

The plurality of apertures 245 of the isolation layer 210 can be aligned to expose the positive terminals 320 of the plurality of cylindrical battery cells 110 through the isolation layer 210 to connect to at least one surface of the first current collector 205.

The plurality of apertures 250 of the second current collector 215 can be aligned to expose the positive terminals 320 of the plurality of cylindrical battery cells 110 through the second conductive layer 215. For example, each of the positive terminals 320 of the plurality of cylindrical battery cells 110 can be positioned such that they extend through at least one of the plurality of apertures 250 of the second current collector 215 to connect to at least one surface of the first current collector 205. The plurality of apertures 240, 245, 250 can be aligned with respect to each other such that a throughway or unobstructed aperture is formed to expose the positive terminals 320 of the plurality of cylindrical battery cells 110 for coupling with at least one surface of the first current collector 205. The pluralities of apertures 240, 245, 250 can be aligned by aligning the boundaries of the apertures 240, 245, 250 between the layers. The pluralities of apertures 240, 245, 250 can be aligned by using a jig, setting mold or tool to align between the layers.

The battery cells 110 can be aligned or arranged within the battery block 105 using a first cell holder 225 and a second cell holder 230. For example, the first cell holder 225 hold, house or align the plurality of battery cells 110 using a fourth plurality of apertures 255. The second cell holder 230 can hold, house or align the plurality of battery cells 110 using a fifth plurality of apertures 260. The first cell holder 225 can be coupled with or include the first current collector 205, the isolation layer 210, and the second current collector 215. The battery cells 110 can be disposed such that a first end or top surface is couple with the first cell holder 225 and a second end or bottom surface is coupled with the second cell holder 230. Thus, the first cell holder 225 and the second cell holder 230 can arrange the battery cells in place.

The method 500 can include mounting the integrated current collector device 115 to the battery cells 110 (ACT 525). For example, the integrated current collector device 115, including the first current collector 205, the isolation layer 210 and the second current collector 215, can be mounted or otherwise coupled with the plurality of cylindrical battery cells 110. The integrated current collector device 115 can be positioned to provide structural support to hold the plurality of cylindrical battery cells 110 in place relative to one another. For example, the first current collector 205 and the second current collector 215 can be mounted, disposed in, or embedded within in the integrated current collector device 115 and onto the plurality of battery cells 110 for welding or bonding (or other fastening) to the positive and negative terminals respectively, of the plurality of battery cells 110. The integrated current collector device 115 can be coupled with, disposed on, or positioned in contact with a top end or first end of each of the plurality of battery cells 110.

The method 500 can include electrically connecting current collector with battery cells 110 (ACT 530). For example, the first current collector 205 can electrically couple with positive terminals 320 of the plurality of cylindrical battery cells 110 at first ends of the plurality of cylindrical battery cells 110 at the first ends of the plurality of cylindrical battery cells 110. The second current collector 215 can electrically couple with negative terminals 325 of the plurality of cylindrical battery cells 110 at the first ends of the plurality of cylindrical battery cells 110. A positive terminal 320 of each of a plurality of battery cells 110 can be coupled with a surface or portion of the first current collector 205 through a positive wirebond 305. The wirebond 305 can extend from the positive terminal 320 of each of a plurality of battery cells 110, though one or more of the apertures 240, 245, 250, 255 and couple with the first current collector 205. For example, a wirebonding tool can attach or connect a bondhead or end of a wirebond 305 to or near a center of a positive terminal 320 of the battery cell 110, and another bondhead or end of the wirebond 305 to an uncoated or uninsulated surface of the first current collector 205. A wirebonding tool can access the positive terminal 320 of the battery cell 110 exposed by one or more of the apertures 240, 245, 250, 255 and can connect one end of a wirebond 305 to the positive terminal 320. The wirebonding tool can connect another end of the wirebond 305 to a surface of an uncoated or uninsulated surface of the first current collector 205.

A negative terminal 325 of each of a plurality of battery cells 110 can couple with a surface or portion of the second current collector 215 through a negative tab 310. For example, the apertures 250 of the second current collector 215 can be formed having a negative tab portion 310 that extends into each of the apertures 250. The negative tab portion 310 can be positioned within a respective aperture 250 such that it couples with or contacts a negative terminal 325 of a battery cell 110 or couples or contacts negative terminals 325 from at least two battery cells 110. A wirebonding tool can access a rim 220 of a battery cell 110 exposed by one or more of the apertures 240, 245, 250, 255 and can connect one end of a wirebond to the rim 220. The wirebonding tool can access a negative tab 310 or other portion of the second current collector 215, and can connect to a surface of the negative tab 310 or other portion of the second current collector 215.

Information about the plurality of battery cells 110 can be collected by a BMU 140 via the one or more sense lines 130. The integrated current collector device 115 can hold the plurality of battery cells 110 in place relative to one another. The BMU 140 can be coupled with the integrated current collector device 115, a battery module 100 or battery block 105 through one or more BMU wires 145. For example, the BMU 140 can be coupled with the sense lines formed in, disposed on, or embedded within the integrated current collector device 115. The BMU 140 can be a component of or integrated with the integrated current collector device 115, a battery module 100 or battery block 105 through one or more BMU wires 145. For example, the BMU 140 can be incorporated into the integrated current collector device 115, during manufacture, such as but not limited to, during the injection molding. At least one of a temperature sensor, a current sensor, and a voltage sensor can be incorporated into the integrated current collector device 115 during the injection molding. The BMU 140 can be coupled with to transmit data to or receive data from the temperature sensor, the current sensor, or the voltage sensor.

The integrated current collector device 115 having the first current collector 205 and the second current collector 215, their associated sense lines 130 and battery cell holders 225, 230 can be incorporated into a single part or component that is ready to mount on battery cells 110. Such a design can enable a single sided, top weld approach for battery cells 110 to make electrical connections from one battery cell 110 to another battery cell 110 from the rim 220 or top cap side. Single sided welding for positive and negative connections can be comparatively easier to handle or perform than the dual sided approach, by simplifying assembly processes for battery blocks 105 or battery modules 100. A single part, integrated current collector structure 115 can improve battery cell to battery cell interconnection design, for instance by decreasing the number of parts for connecting to battery cells 110, and isolating the first current collector 205 and the second current collector 215 while holding these and the battery cells 110 together.

The single part comprising the stacked configuration can incorporate protective features including channels 150, routing vents, cutouts or apertures for vent gasses to escape through the top (e.g., to support certain types of battery cells, such as bottom vent cells). The battery cells 110 can be vented from a first surface or top surface of the respective battery cell 110. For example, the battery cells 110 can be vented from the same surface or side that both the positive and negative weld connections are formed. The apertures formed on the first current collector 205, second current collector 215, and first cell holder 225 can be sized based at least on an area needed for welding and in part on an area needed to vent gases to escape. Aspects of the first current conductor 205 and the second current collector 215 are discussed herein only by way of limitation, and are not intended to be limiting in any way. Instead of stacked layers (e.g., in the z direction), the first current collector 205 can comprise strips of conductors arranged in a parallel configuration along a first direction (e.g., in the x direction), and the second current collector 215 can comprise strips of conductors arranged in a parallel configuration along a second direction (e.g., in the y direction) different from the first direction.

Figure 6:
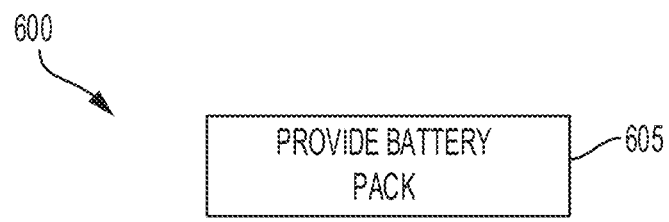
FIG. 6 is a flow diagram depicting an illustrative embodiment of a method for providing a system to power an electric vehicle.

FIG. 6, among others, depicts an example embodiment of a method 600 of providing a system to power an electric vehicle 405 is depicted. The method 600 can include providing a battery pack (ACT 605). The battery pack 440 can include a plurality of battery modules 100. Each of the plurality of battery modules 100 can include a plurality of battery blocks 105. A first battery block 105 of the plurality of battery blocks 105 can include a pair of battery block terminals 330, 335. The first battery block 105 can include a plurality of cylindrical battery cells 110. Each of the plurality of cylindrical battery cells 110 can include a positive terminal 320 and a negative terminal 325. An integrated current collector device 115 can be formed in a single structure. The integrated current collector device 115 can include a first current collector 205 having a conductive layer. The conductive layer of the first current collector 205 can couple the first current collector 205 with positive terminals 320 of the plurality of cylindrical battery cells 110 at first ends of the plurality of cylindrical battery cells 110. A second current collector 215 can include a conductive layer. The conductive layer of the second current collector 215 can couple the second current collector 215 with negative terminals 325 of the plurality of cylindrical battery cells 110 at the first ends of the plurality of cylindrical battery cells 110. An isolation layer 210 can be disposed between the first current collector 205 and the second current collector 215. The isolation layer 210 can electrically isolate the first current collector 205 from the second current collector 215. The isolation layer 210 can bind the first current collector 205 with the second current collector 215 to form the single structure of the integrated current collector device 115. The integrated current collector device 115 can provide structural support to hold the plurality of cylindrical battery cells 110 in place relative to one another when the plurality of cylindrical battery cells 110 are electrically connected with the first current collector 205 and the second current collector 215.

While acts or operations may be depicted in the drawings or described in a particular order, such operations are not required to be performed in the particular order shown or described, or in sequential order, and all depicted or described operations are not required to be performed. Actions described herein can be performed in different orders.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. For example the voltage across terminals of battery cells can be greater than 5V. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system to power electric vehicles, comprising:
a battery pack to power an electric vehicle, the battery pack comprising a plurality of battery modules;
each of the plurality of battery modules comprising a plurality of battery blocks;
a first battery block of the plurality of battery blocks having a pair of battery block terminals, the first battery block comprising a plurality of cylindrical battery cells;
each of the plurality of cylindrical battery cells having a positive terminal and a negative terminal;
an integrated current collector device formed in a single structure, the integrated current collector device comprising:
a first current collector having a conductive layer, the conductive layer of the first current collector coupling the first current collector with the positive terminals of the plurality of cylindrical battery cells at first ends of the plurality of cylindrical battery cells;
a second current collector having a conductive layer, the conductive layer of the second current collector coupling the second current collector with the negative terminals of the plurality of cylindrical battery cells at the first ends of the plurality of cylindrical battery cells; and
an isolation layer disposed between the first current collector and the second current collector, the isolation layer electrically isolates the first current collector from the second current collector, the isolation layer binds the first current collector with the second current collector to form the single structure of the integrated current collector device; and
the integrated current collector device provides structural support to hold the plurality of cylindrical battery cells in place relative to one another when the plurality of cylindrical battery cells are electrically connected with the first current collector and the second current collector.

2. The system of claim 1, comprising:
the integrated current collector device includes a plurality of slots for holding the plurality of cylindrical battery cells in place relative to one another.

3. The system of claim 1, comprising:
one or more sense lines to connect the first current collector to a battery monitoring unit (BMU), the one or more sense lines to convey information about the plurality of cylindrical battery cells to the BMU.

4. The system of claim 1, comprising:
one or more sense lines to connect to the second current collector to a battery monitoring unit (BMU), the one or more sense lines to convey information about the plurality of cylindrical battery cells to the BMU.

5. The system of claim 1, comprising:
the integrated current collector includes a battery monitoring unit (BMU) embedded within the isolation layer.

6. The system of claim 1, comprising:
the integrated current collector includes at least one of a temperature sensor, a current sensor or a voltage sensor embedded within the isolation layer.

7. The system of claim 1, wherein the isolation layer includes a dielectric material, a plastic material, an epoxy material, a glass-reinforced epoxy laminate material, a polypropylene flame retardant and electrically insulating material or a polycarbonate flame retardant and electrically insulating material.

8. The system of claim 1, comprising:
the integrated current collector device coupled with the first ends of the plurality of cylindrical battery cells.

9. The system of claim 1, comprising:
the first current collector having a plurality of apertures aligned with a plurality of apertures defined on the second current collector.

10. The system of claim 1, comprising:
a battery pack that includes a plurality of integrated current collector devices, the integrated current collector devices to spatially maintain the cylindrical battery cells relative to each other to at least meet creepage-clearance requirements for the battery pack to support a voltage of at least 400 volts across a positive terminal and a negative terminal of the battery pack.

11. The system of claim 1, comprising:
a plurality of channels in the integrated current collector device, the plurality of channels to vent gaseous release from the plurality of cylindrical battery cells.

12. The system of claim 1, comprising:
the battery pack disposed in the electric vehicle.

13. The system of claim 1, comprising:
the battery pack disposed in the electric vehicle;
the first current collector coupled with a first busbar of the electric vehicle to provide electric power from the battery pack to the electric vehicle; and
the second current collector coupled with a second busbar of the electric vehicle to provide electric power from the battery pack to the electric vehicle.

14. A method of providing a system to power electric vehicles, the method, comprising:

providing a battery pack to power an electric vehicle, the battery pack comprising a plurality of battery modules, each of the plurality of battery modules comprising a plurality of battery blocks, a first battery block of the plurality of battery blocks having a pair of battery block terminals;

disposing a plurality of cylindrical battery cells in the first battery block, each of the cylindrical battery cells having a positive terminal and a negative terminal;

forming an integrated current collector device via injection molding, the integrated current collector device having a first current collector, a second current collector, and an isolation layer disposed between the first current collector and the second current collector;

electrically isolating, using the isolation layer, the first current collector from the second current collector in the integrated current collector device;

mounting the integrated current collector device, including the first current collector, the second current collector, and the isolation layer, to the plurality of cylindrical battery cells, the integrated current collector device provides structural support to hold the plurality of cylindrical battery cells in place relative to one another;

electrically connecting the first current collector to the positive terminals of the plurality of cylindrical battery cells at first ends of the plurality of cylindrical battery cells, and electrically connecting the second current collector to the negative terminals of the plurality of cylindrical battery cells at the first ends of the plurality of cylindrical battery cells.

15. The method of claim 14, comprising:
connecting one or more sense lines to at least one of the first current collector and the second current collector; and collecting information about the plurality of cylindrical battery cells to convey to a battery monitoring unit (BMU) via the one or more sense lines.

16. The method of claim 14, comprising:
incorporating a battery monitoring unit (BMU) into the isolation layer during the injection molding.

17. The method of claim 14, comprising:
incorporating into the isolation layer at least one of a temperature sensor, a current sensor and a voltage sensor during the injection molding.

18. The method of claim 11, comprising:
aligning a plurality of apertures defined on the first current collector, with a plurality of apertures defined on the second current collector.

19. The method of claim 14, comprising:
spatially maintaining the cylindrical battery cells relative to each other to at least meet creepage-clearance requirements for the battery pack to support a voltage of at least 400 volts across a positive terminal and a negative terminal of the battery pack.

20. An electric vehicle, comprising:
a battery pack to power an electric vehicle, the battery pack comprising a plurality of battery modules;

each of the plurality of battery modules comprising a plurality of battery blocks;

a first battery block of the plurality of battery blocks having a pair of battery block terminals, the first battery block comprising a plurality of cylindrical battery cells;

each of the plurality of cylindrical battery cells having a positive terminal and a negative terminal;

an integrated current collector device formed in a single structure, the integrated current collector device comprising:

a first current collector having a conductive layer, the conductive layer of the first current collector coupling the first current collector with the positive terminals of the plurality of cylindrical battery cells at first ends of the plurality of cylindrical battery cells;

a second current collector having a conductive layer, the conductive layer of the second current collector coupling the second current collector with the negative terminals of the plurality of cylindrical battery cells at the first ends of the plurality of cylindrical battery cells; and an isolation layer disposed between the first current collector and the second current collector, the isolation layer electrically isolating the first current collector from the second current collector, the isolation layer binds the first current collector with the second current collector to form the single structure of the integrated current collector device; and the integrated current collector device provides structural support to hold the plurality of cylindrical battery cells in place relative to one another when the plurality of cylindrical battery cells are electrically connected with the first current collector and the second current collector.

* * * * *